(12) United States Patent
Shimoyama et al.

(10) Patent No.: US 9,531,539 B2
(45) Date of Patent: Dec. 27, 2016

(54) INFORMATION PROCESSING APPARATUS, AND INFORMATION PROCESSING METHOD

(71) Applicant: FUJITSU LIMITED, Kawasaki-shi, Kanagawa (JP)

(72) Inventors: Takeshi Shimoyama, Shinagawa (JP); Masaya Yasuda, Kawasaki (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/577,482

(22) Filed: Dec. 19, 2014

(65) Prior Publication Data

US 2015/0207630 A1    Jul. 23, 2015

(30) Foreign Application Priority Data

Jan. 20, 2014    (JP) .................................. 2014-008151

(51) Int. Cl.
| | |
|---|---|
| *H04L 29/00* | (2006.01) |
| *H04L 9/32* | (2006.01) |
| *H04L 29/06* | (2006.01) |
| *G06F 21/32* | (2013.01) |
| *H04L 9/00* | (2006.01) |
| *G06Q 20/40* | (2012.01) |

(52) U.S. Cl.
CPC ............. *H04L 9/3231* (2013.01); *G06F 21/32* (2013.01); *H04L 9/008* (2013.01); *H04L 63/0861* (2013.01); *G06Q 20/40145* (2013.01)

(58) Field of Classification Search
CPC .............................. H04L 63/06; H04L 9/0861
USPC ............................................. 713/186; 380/44
See application file for complete search history.

(56) References Cited

U.S. PATENT DOCUMENTS

| | | | |
|---|---|---|---|
| 2003/0219121 A1 | 11/2003 | van Someren | |
| 2008/0178008 A1* | 7/2008 | Takahashi | ............... G06F 21/32 713/186 |
| 2012/0207299 A1 | 8/2012 | Hattori et al. | |
| 2013/0212645 A1* | 8/2013 | Takahashi | ............. H04L 9/3231 726/3 |
| 2014/0101444 A1* | 4/2014 | Lee | ..................... H04L 63/0428 713/168 |

(Continued)

FOREIGN PATENT DOCUMENTS

WO    WO 2011/052056    5/2011

OTHER PUBLICATIONS

European Office Action dated Jul. 21, 2016 in corresponding European Patent Application No. 14 197 912.0.

(Continued)

*Primary Examiner* — Anthony Brown
*Assistant Examiner* — Michael D Anderson
(74) *Attorney, Agent, or Firm* — Staas & Halsey LLP

(57) ABSTRACT

A non-transitory computer-readable recording medium stores an information processing program that causes a computer to execute a process including, generating feature information based on organism information of a user; calculating a first cryptogram based on a logical operation of the feature information generated and a random number; and encrypting the first cryptogram into a second cryptogram by using a cryptographic algorithm capable of calculating a Hamming distance in an encrypted state.

15 Claims, 13 Drawing Sheets

(56) References Cited

U.S. PATENT DOCUMENTS

2014/0185797 A1* 7/2014 Yasuda .................. H04L 9/008
380/44

OTHER PUBLICATIONS

Wong, Kok-Seng, et al., "A Privacy-Preserving Biometric Matching Protocol for Iris Codes Verification," *2012 Third FTRA International Conference on Mobile, Ubiquitous, and Intelligent Computing*, Conference Publishing Services, Jun. 2012, pp. 120-125.

Yasuda, Masaya, et al., "Packer Homomorphic Encryption Based on Ideal Lattices and Its Application to Biometrics," *Security Engineering and Intelligence Informatics—CD—ARES 2013 Workshops (Lecture Notes in Computer Science)*, vol. 8128, Sep. 2013, pp. 55-74.

Extended European Search Reported mailed Jul. 13, 2015 for European Patent Application No. 14197912.0.

* cited by examiner

INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2014-008151, filed on Jan. 20, 2014, the entire contents of which are incorporated herein by reference.

FIELD

The embodiments discussed herein are related to an information processing program, an information processing apparatus, and an information processing method.

BACKGROUND

In recent years, there has been known an authentication system that uses biometric authentication such as fingerprint authentication or vein authentication to perform, for example, personal authentication of a user in front of an automated teller machine (ATM) of a bank. The biometric authentication is an authentication technique that uses organism information including physical and behavioral features of a user. There is no possibility of forgetting or losing the organism information of the user that is used for authentication. However, the organism information is unchangeable over lifetime of a user and hence, it is not preferable that the organism information is leaked. Accordingly, there has been proposed authentication in a state that organism information of a user is protected by random number addition, encryption, or the like.

Patent Document 1: International Publication Pamphlet No. WO 2011/052056

However, even when organism information of a user is encrypted by using public key encryption in a terminal unit, an authentication server having a secret key is capable of decoding a code and hence, when the security of the authentication server is compromised, the organism information of the user is leaked. Therefore, it becomes impossible hereafter to use the leaked organism information of the user. That is, to consider a case where the organism information is only encrypted, when the security of an authentication server is compromised, the authentication system per se fails.

SUMMARY

According to an aspect of an embodiment, a non-transitory computer-readable recording medium stores an information processing program that causes a computer to execute a process including, generating feature information based on organism information of a user; calculating a first cryptogram based on a logical operation of the feature information generated and a random number; and encrypting the first cryptogram into a second cryptogram by using a cryptographic algorithm capable of calculating a Hamming distance in an encrypted state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. A technique disclosed herein is not limited to the embodiments. Furthermore, the following embodiments may be appropriately combined with each other without departing from the gist of the present invention.

[a] First Embodiment

Figure 1:
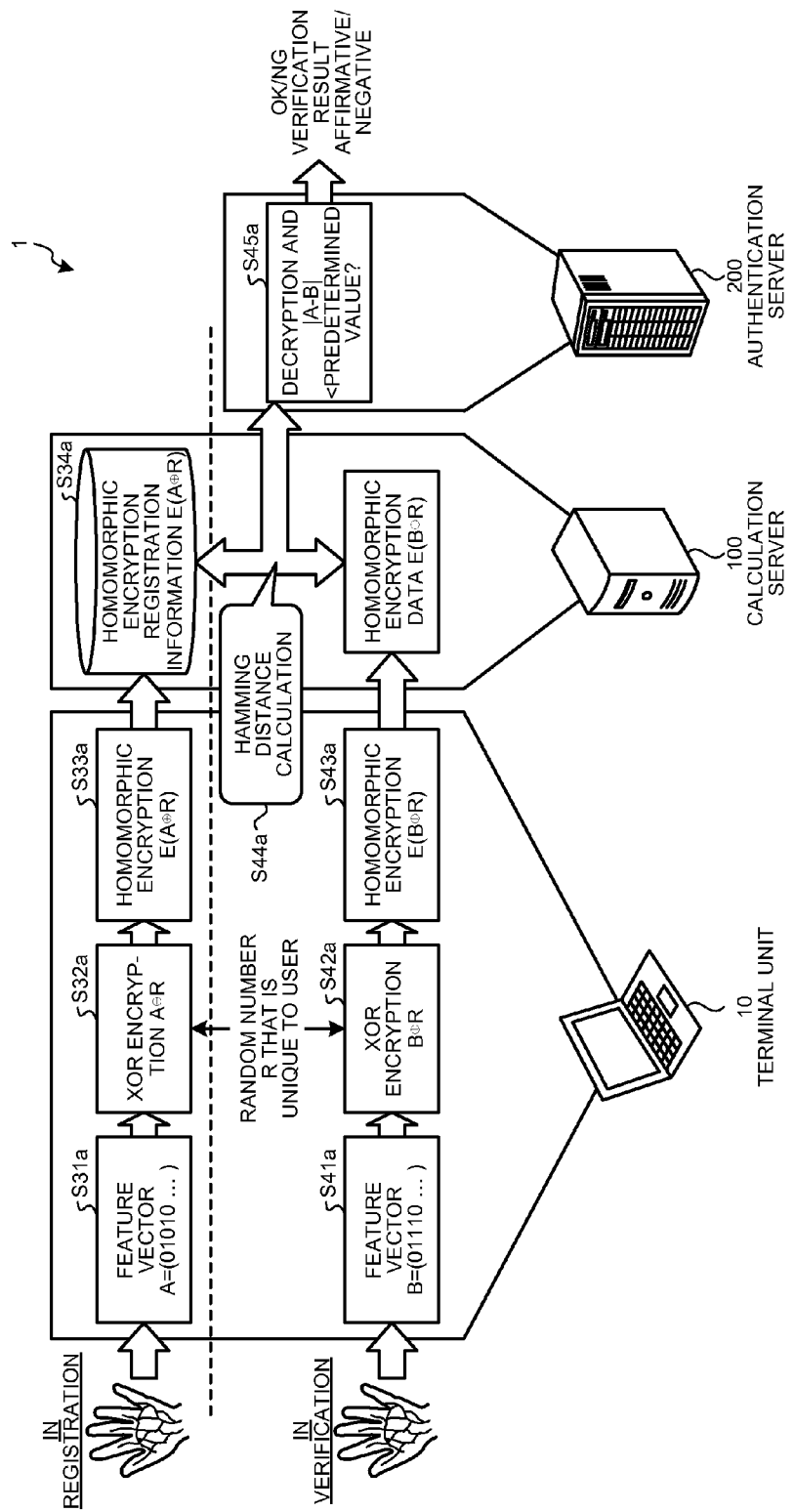
FIG. 1 is an explanatory view for explaining the outline of an authentication system in a first embodiment of the present invention.

First, the outline of an authentication system in a first embodiment of the present invention is explained in conjunction with FIG. 1. FIG. 1 is an explanatory view for explaining the outline of the authentication system in the first embodiment. An authentication system 1 illustrated in FIG. 1 has a terminal unit 10, a calculation server 100, and an authentication server 200. The terminal unit 10, the calculation server 100, and the authentication server 200 are connected with each other in a communicable manner.

The terminal unit 10 is an information processor, which is a terminal unit that performs registration and verification of organism information of a user in the authentication system 1. The terminal unit 10 acquires, when performing registration and verification of organism information, organism information of a user, encrypts the acquired organism information in two steps of an exclusive OR; that is, an exclusive logical sum (XOR) and homomorphic encryption, and transmits the encrypted organism information to the calculation server 100.

When registration of organism information is performed, for example, organism information of a user is acquired by a sensor (not illustrated in the drawings) of the terminal unit 10, and a feature vector A is generated as feature information based on the acquired organism information (Step S31*a*). The terminal unit 10 calculates an exclusive logical sum of the feature vector A and a random number R, which is unique to a user, generated based on a password or the like specified by the user, and performs XOR encryption to calculate a first cryptogram (Step S32*a*).
Character 1
The character $\oplus$ indicates an exclusive logical sum, and is also expressed as xor hereinafter.

The terminal unit 10 further encrypts the first cryptogram into a second cryptogram by using an algorithm capable of calculating a Hamming distance (signal distance) in an encrypted state; using, for example, a public key of the homomorphic encryption, and transmits the second cryptogram to the calculation server 100 (Step S33*a*). The calculation server 100 receives the second cryptogram from the terminal unit 10, and stores the second cryptogram as registration information (Step S34*a*).

Furthermore, when verification of organism information is performed, a feature vector B is generated as feature information based on the acquired organism information in the same manner as the case that registration of the organism information is performed (Step S41*a*). The terminal unit 10 calculates an exclusive logical sum of the feature vector B and the random number R that is unique to a user and generated based on a password or the like specified by the user, and performs XOR encryption to calculate a first cryptogram (Step S42*a*).

The terminal unit 10 further encrypts the first cryptogram into a second cryptogram by using an algorithm capable of calculating a Hamming distance (signal distance) in an encrypted state; for example, a public key of the homomorphic encryption, and transmits the second cryptogram to the calculation server 100 (Step S43*a*). The calculation server 100 receives the second cryptogram from the terminal unit 10, and calculates a Hamming distance, in an encrypted state, between the second cryptogram above and the other second cryptogram stored as registration information when registration of the organism information is performed. The calculation server 100 transmits the calculated Hamming distance to the authentication server 200 (Step S44*a*). The authentication server 200 receives the Hamming distance, and decrypts the Hamming distance by using the secret key of homomorphic encryption. When the Hamming distance decrypted into a plaintext is less than a predetermined value, the authentication server 200 transmits a verification result of affirmative; that is, a verification result of approving the authentication of the Hamming distance, to the terminal unit 10. Furthermore, the authentication server 200 transmits, when the Hamming distance decrypted into a plaintext is equal to or more than the predetermined value, a verification result of negative; that is, a verification result of rejecting the authentication of the Hamming distance, to the terminal unit 10 (Step S45*a*).

In this case, only the authentication server 200 has a secret key of homomorphic encryption. That is, the authentication server 200 is capable of decrypting the second cryptogram of the calculation server 100. However, the authentication server 200 is, even when decrypting the second cryptogram, capable of acquiring only the first cryptogram encrypted by the XOR encryption, and incapable of decrypting the feature vector A or B because of unknown random number R. Accordingly, a user who operates the terminal unit 10 is capable of keeping organism information secret to the authentication server 200.

Figure 2:
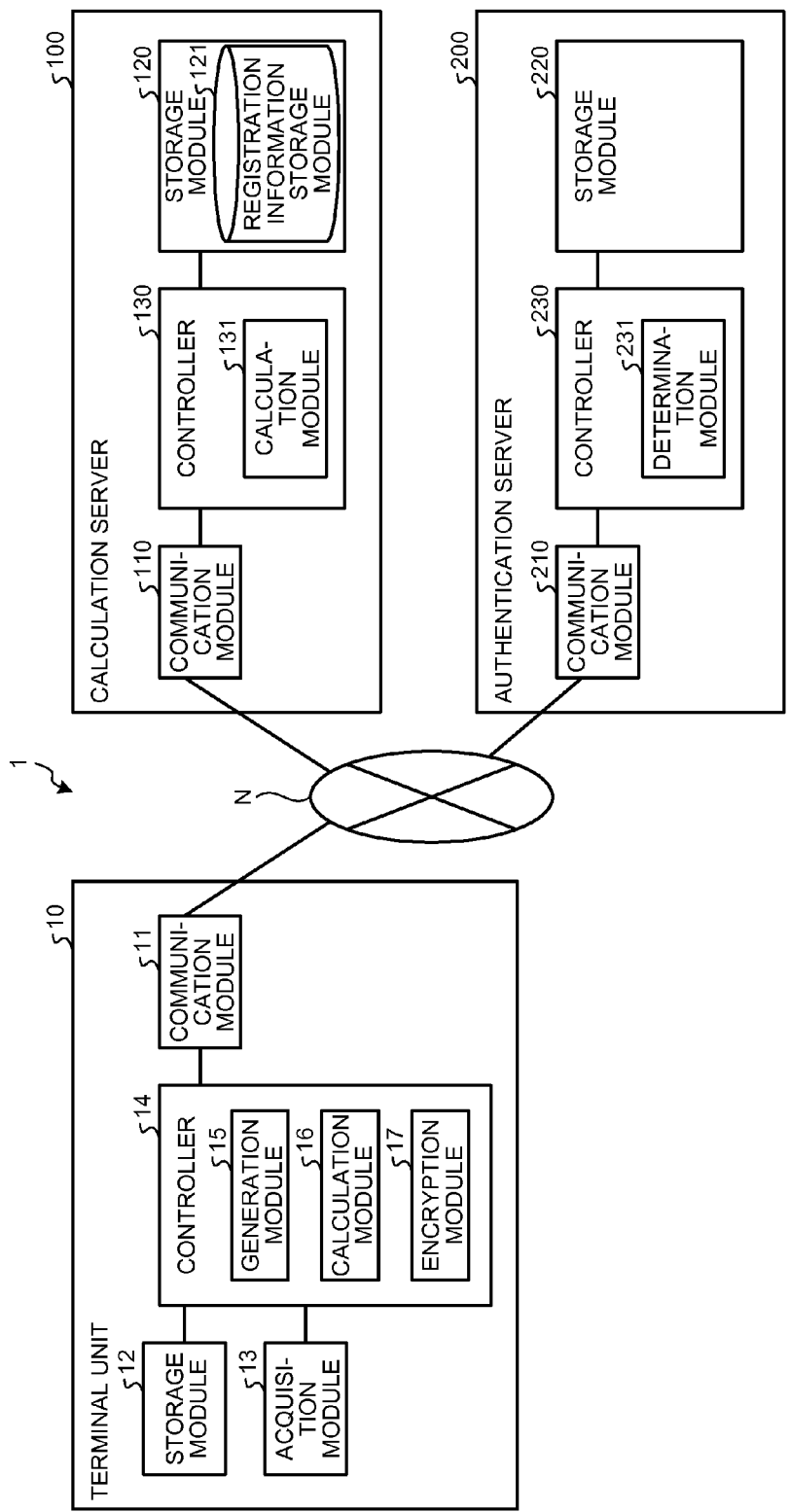
FIG. 2 is a block diagram illustrating one example of a configuration of the authentication system in the first embodiment.

Next, a configuration of the authentication system 1 in the first embodiment is explained in conjunction with FIG. 2. FIG. 2 is a block diagram illustrating one example of the configuration of the authentication system in the first embodiment. The authentication system 1 illustrated in FIG. 2 has the terminal unit 10, the calculation server 100, and the authentication server 200. Here, in FIG. 2, although the case where a system has one terminal unit 10 is illustrated, the number of the terminal units 10 is not limited, and the authentication system 1 may have the arbitrary number of terminal units 10.

The terminal unit 10, the calculation server 100, and the authentication server 200 are connected with each other via a network N in a communicable manner. In the network N, regardless of a wired or wireless network, including the Internet, arbitrary kinds of communication networks such as a Local Area Network (LAN) or a Virtual Private Network (VPN) may be adopted.

The terminal unit 10 has a communication module 11, a storage module 12, an acquisition module 13, and a controller 14. Here, the terminal unit 10 may have various kinds of function modules with which a known computer is provided, such as various kinds of input devices or voice output devices, in addition to the function modules illustrated in FIG. 2.

The communication module 11 is achieved by a network interface card (NIC) or the like. The communication module 11 is a communication interface that is connected with the calculation server 100 and the authentication server 200 via the network N in a wired or wireless manner, and controls the communication of information between the calculation server 100 and the authentication server 200. The communication module 11 transmits, when feature information based on organism information of a user is registered, the second cryptogram that is input from the controller 14 and doubly encrypted to the calculation server 100. The communication module 11 also transmits, when verification of the feature information based on the organism information of the user is performed, the second cryptogram that is input from the controller 14 and doubly encrypted to the calculation server 100, and receives a verification result from the authentication server 200. The communication module 11 outputs the received verification result to the controller 14.

The storage module 12 is achieved by a semiconductor memory element such as a random access memory (RAM) or a flash memory, a storage device such as a hard disk drive or an optical disc drive, or the like. The storage module 12 stores therein information used for processing in the controller 14.

The acquisition module 13 acquires organism information of a user. The acquisition module 13 picks up an image of a fingerprint, a retina, an iris, a face, a blood vessel, or the like with the use of an imaging sensor or the like, and outputs the image data of the images picked up to the controller 14 as organism information. Here, the acquisition module 13 is not necessarily limited to acquiring image data as organism information, but may acquire a sound, handwriting, or the like as organism information. Furthermore, the acquisition module 13 accepts the input of a password from a user to acquire the password. The acquisition module 13 outputs the acquired password to the controller 14.

The controller 14 is achieved when a program stored in an internal storage device is executed by a central processing unit (CPU), a micro processing unit (MPU), or the like with the use of a RAM as a work area. Furthermore, the controller 14 may be achieved by an integrated circuit such as an application specific integrated circuit (ASIC) or a field programmable gate array (FPGA). The controller 14 has a generation module 15, a calculation module 16, and an encryption module 17, and achieves or performs functions and operations of information processing that will be explained below. Here, the internal configuration of the controller 14 is not limited to the configuration illustrated in FIG. 2, and any configuration may be adopted provided that the configuration is capable of performing information processing described below. Furthermore, the controller 14 performs, when a verification result is input from the communication module 11, processing corresponding to the verification result. In addition, the controller 14 may perform processing that controls whether to perform encryption processing in the encryption module 17 in a case out of the following cases: both of when registration of feature information is performed and when verification of feature information is performed, when registration of feature information is performed, and when verification of feature information is performed.

The generation module 15 extracts, when organism information of a user is input from the acquisition module 13, a feature from the organism information, and generates feature information. The feature information may constitute, when the organism information is a blood vessel image, information based on the clogging state (density), a color density, or the like of a blood vessel. Furthermore, the feature information may constitute, when the organism information is a fingerprint image, information of branch points or the like of a fingerprint pattern that are extracted as feature points. The Feature information is also referred to as a feature vector in the following explanations. The generation module 15 outputs, for example, a feature vector when registration of feature information is performed as a feature vector A and a feature vector when verification of feature information is performed as a feature vector B, to the calculation module 16.

The calculation module 16 calculates a first cryptogram based on the exclusive logical sum of feature information and a random number. The calculation module 16 inputs thereto the feature vector A or the feature vector B as feature information from the generation module 15. The calculation module 16 calculates a first cryptogram based on the exclusive logical sum of the feature vector A and a random number R. Furthermore, the calculation module 16 calculates a first cryptogram based on the exclusive logical sum of the feature vector B and the random number R. Here, in the explanation made hereinafter, when the first cryptogram in the case where registration of feature information is performed is discriminated from the other first cryptogram in the case where verification of feature information is performed, for example, the first cryptogram calculated based on the exclusive logical sum of the feature vector A and the random number R in the case where registration of feature information is performed is referred to as a third cryptogram. In this case also, for example, the other first cryptogram calculated based on the exclusive logical sum of the feature vector B and the random number R in the case where verification of feature information is performed is referred to as a fourth cryptogram.

Here, the calculation module 16 generates, for example, the random number R with the use of a password input from the acquisition module 13 as a seed. The random number R is generated by a known method for generating a random number. The random number R is, for example, generable by the method specified in ISO/IEC 18031, ANSI X9.82, NIST SP800-90, or the like. Here, a random number R generated with the use of an identical seed has an identical value even when a different terminal unit is used. As the seed of the random number R, a password stored in an integrated circuit (IC) card in advance may be acquired by using an IC card reader that is not illustrated in the drawings, and information other than the password may be used provided that the information constitutes a value unique to a user. The abovementioned exclusive logical sum is an exclusive logical sum for every binary bit. The calculation module 16 outputs the third cryptogram or the fourth cryptogram, whichever is calculated, to the encryption module 17.

The encryption module 17 encrypts the first cryptogram encrypted by the XOR encryption into a second cryptogram by using a cryptographic algorithm capable of calculating a Hamming distance in an encrypted state; using, for example, a homomorphic encryption. To be more specific, for example, the encryption module 17 inputs thereto the third cryptogram or the fourth cryptogram as the first cryptogram from the calculation module 16. The encryption module 17 encrypts the third cryptogram into the second cryptogram corresponding to the third cryptogram by using the public key of homomorphic encryption. In the explanation made hereinafter, when the second cryptogram corresponding to the third cryptogram is discriminated from the other second cryptograms, the second cryptogram corresponding to the third cryptogram is referred to as a fifth cryptogram. Furthermore, the encryption module 17 encrypts the fourth cryptogram into the second cryptogram corresponding to the fourth cryptogram by using the public key of homomorphic encryption. In the explanation made hereinafter, when the second cryptogram corresponding to the fourth cryptogram is discriminated from the other second cryptograms, the second cryptogram corresponding to the fourth cryptogram is referred to as the sixth cryptogram. The encryption module 17 may use lattice-based homomorphic encryption such as Ideal lattices or Learning with Errors over Rings (Ring-LWE) as an encryption algorithm. Here, a public key distributed from the authentication server 200 in advance is used for the public key of the homomorphic encryption.

The encryption module 17 transmits the encrypted second cryptogram to the calculation server 100 via the communication module 11. That is, the encryption module 17 transmits the fifth cryptogram to the calculation server 100 via the communication module 11 when the registration of the feature information is performed based on organism information of a user, and transmits the sixth cryptogram to the calculation server 100 via the communication module 11 when the verification of the feature information is performed based on organism information of a user.

The calculation server 100 has a communication module 110, a storage module 120, and a controller 130. Here, the calculation server 100 may have various kinds of function modules with which a known computer is provided, such as various kinds of input devices or voice output devices, in addition to the function modules illustrated in FIG. 2.

The communication module 110 is achieved, for example, by the NIC or the like. The communication module 110 is a communication interface that is connected with the terminal unit 10 and the authentication server 200 via the network N in a wired or wireless manner, and controls the communication of information between the terminal unit 10 and the authentication server 200. The communication module 110 receives the second cryptogram from the terminal unit 10. The communication module 110 receives, when the registration of the feature information based on organism information of a user is performed, for example, the fifth cryptogram as the second cryptogram. Furthermore, the communication module 110 receives, when the verification of the feature information based on organism information of a user is performed, for example, the sixth cryptogram as the second cryptogram. The communication module 110 outputs the received second cryptogram to the controller 130. Furthermore, the communication module 110 transmits, when a Hamming distance is input from the controller 130, the Hamming distance to the authentication server 200.

The storage module 120 is achieved by a semiconductor memory element such as a RAM or a flash memory, a storage device such as a hard disk drive or an optical disc drive. The storage module 120 has a registration information storage module 121. Furthermore, the storage module 120 stores therein information used for processing in the controller 130.

The registration information storage module 121 stores therein the second cryptogram received from the terminal unit 10 in a state that the second cryptogram is, for example, associated with a user identifier (ID) so that each user is identifiable. That is, the registration information storage module 121 stores therein the fifth cryptogram as the second cryptogram in a state that the second cryptogram is, for example, associated with a user ID so that each user is identifiable.

The controller 130 is achieved when a program stored in an internal storage device is executed by a CPU, a MPU, or the like with the use of a RAM as a work area. Furthermore, the controller 130 may be achieved by an integrated circuit such as an ASIC or an FPGA. The controller 130 has a calculation module 131, and achieves or performs functions or operations of information processing that will be explained hereinafter. Here, the internal configuration of the controller 130 is not limited to the configuration illustrated in FIG. 2, and any configuration may be adopted provided that the configuration is capable of performing information processing described below.

The calculation module 131 stores, when the fifth cryptogram is input as the second cryptogram from the communication module 110, the fifth cryptogram in the registration information storage module 121. The calculation module 131 reads out, when the sixth cryptogram is input from the communication module 110 as the second cryptogram, the fifth cryptogram corresponding to the user of the sixth cryptogram from the registration information storage module 121 to calculate the Hamming distance of the fifth cryptogram and the sixth cryptogram. A Hamming distance HW can be expressed by the following expression (1), where the feature vector of the fifth cryptogram is expressed by a symbol A, the feature vector of the sixth cryptogram is expressed by a symbol B, and a public key is expressed by a symbol pk. Here, a symbol E indicates a cryptogram.

$$E((A \oplus R - B \oplus R)^2, pk) = E(HW(A \oplus B), pk) \quad (1)$$

The left side of the expression (1) can be calculated as the following expression (2) by using summing and multiplication (squaring calculation) operations of homomorphic encryption. Here, the left side of the expression (1) is expressed as c in the expression (2). Furthermore, in the explanation made hereinafter, a Hamming distance calculated is also expressed as |A-B|; that is, subtraction of vectors.

$$c = E(HW(A \oplus R)) + E(HW(B \oplus R)) - 2 \times E(HW(A \oplus R)) \times E(HW(B \oplus R)) \quad (2)$$

As can be seen from expression (1), in the operation of the Hamming distance HW (AxorB), the random number R is eliminated and hence, the calculation server 100 can calculate the Hamming distance even when the random number R is unknown. The calculation module 131 transmits the calculated Hamming distance to the authentication server 200 via the communication module 110.

Here, the calculation of a Hamming distance is accelerable by using a method disclosed in Japanese Patent Application No. 2012-286251. The method is, in the Hamming distance (signal distance) calculation using a lattice-based homomorphic encryption, capable of reducing both the size of a feature vector (encryption vector data) and the calculating time of the Hamming distance. The method converts a feature vector into a multinomial, and keeps the multinomial converted secret as one cryptogram. The method uses, as a calculation of the Hamming distance, an encryption operation of the multinomial calculation of the lattice-based homomorphic encryption as described in the following expression (3). That is, the Hamming distance can be calculated by operating encryption multiplication once, encryption addition twice, encryption subtraction once, and encryption scalar operation once. Accordingly, in this method, the data size of the cryptogram of the Hamming distance and the calculating time of the Hamming distance can be reduced considerably. Here, in this method, for improvement in the speed of processing, a random number whose bits are arranged in the reverse order compared with the random number R used in registration is used in verification.

$$E(a(x)) \times E(b(x)) = E(a(x) \times b(x)) \quad (3)$$

In the case of 2048 dimensions, for example, the data size of the cryptogram of a Hamming distance conventionally constitutes 2048 cryptograms of $(E(a_1), \ldots, E(a_{2048}))$. However, in this method, the data size of the cryptogram of the Hamming distance constitutes one cryptogram of $E(a(x))$ and hence, the data size can be reduced to $1/2048$. Furthermore, in calculating the Hamming distance, as a calculating time $th_1$ described in the following expression (4), conventionally, it is needed to perform encryption multiplication 2048 times. In contrast, in this method, as a calculating time $th_2$ described in the following expression (5), encryption multiplication is performed once. That is, in this method, the speed of processing can be increased 2048 times compared with a conventional method. For example, in this method, verification can be performed in several milliseconds in the case of 2048 dimensions (2048 bits). That is, in this method, verification processing can be performed in practical time.

$$th_1 = \Sigma(E(ai) + E(bi) + 2E(ai) \times E(bi)) \quad (4)$$

$$th_2 = E(HW(a)) + E(HW(b)) - 2E(a(x)) \times E(b(x)) \quad (5)$$

The authentication server 200 has a communication module 210, a storage module 220, and a controller 230. Here, the authentication server 200 may have various kinds of function modules with which a known computer is provided, such as various kinds of input devices or voice output devices, in addition to the function modules illustrated in FIG. 2.

The communication module 210 is achieved by the NIC or the like. The communication module 210 is a communication interface that is connected with the terminal unit 10 and the calculation server 100 via the network N in a wired or wireless manner, and controls the communication of information between the terminal unit 10 and the calculation server 100. The communication module 210 receives a Hamming distance from the calculation server 100. The communication module 210 outputs the received Hamming distance to the controller 230. The communication module 210 also transmits, when a verification result is input from the controller 230, the verification result to the terminal unit 10.

The storage module 220 is achieved by a semiconductor memory element such as a RAM or a flash memory, or a storage devices such as a hard disk drive or an optical disc drive. The storage module 220 stores therein information used for processing in the controller 230.

The controller 230 is achieved when a program stored in an internal storage device is executed by a CPU, an MPU, or the like with the use of a RAM as a work area. Furthermore, the controller 230 may be achieved by an integrated circuit such as an ASIC or an FPGA. The controller 230 has a determination module 231, and achieves or performs functions or operations of information processing that will be explained hereinafter. Here, the internal configuration of the controller 230 is not limited to the configuration illustrated in FIG. 2, and any configuration may be adopted provided that the configuration is capable of performing information processing described below. Furthermore, the controller 230 controls a public key and a secret key of homomorphic encryption, and distributes the public key to the terminal unit 10 that belongs to the authentication system 1 via the communication module 210.

The determination module 231 decrypts, when a Hamming distance is input from the communication module 210, the Hamming distance with the secret key of the homomorphic encryption. The determination module 231 determines whether the Hamming distance decrypted into the plaintext is less than a predetermined value. The determination module 231 determines the Hamming distance to be authenticated when the Hamming distance decrypted into the plaintext is less than a predetermined value (affirmative). The determination module 231 determines the Hamming distance not to be authenticated when the Hamming distance decrypted into the plaintext is equal to or more than the predetermined value (negative). The determination module 231 can set the predetermined value to approximately a half of the bit string of the Hamming distance; for example, 1024 bits when the Hamming distance constitutes a bit string of 2048 dimensions. The determination module 231 transmits the contents of determination as a verification result to the terminal unit 10 via the communication module 210.

Next, the operation of the authentication system 1 in the first embodiment is explained.

Figure 3:
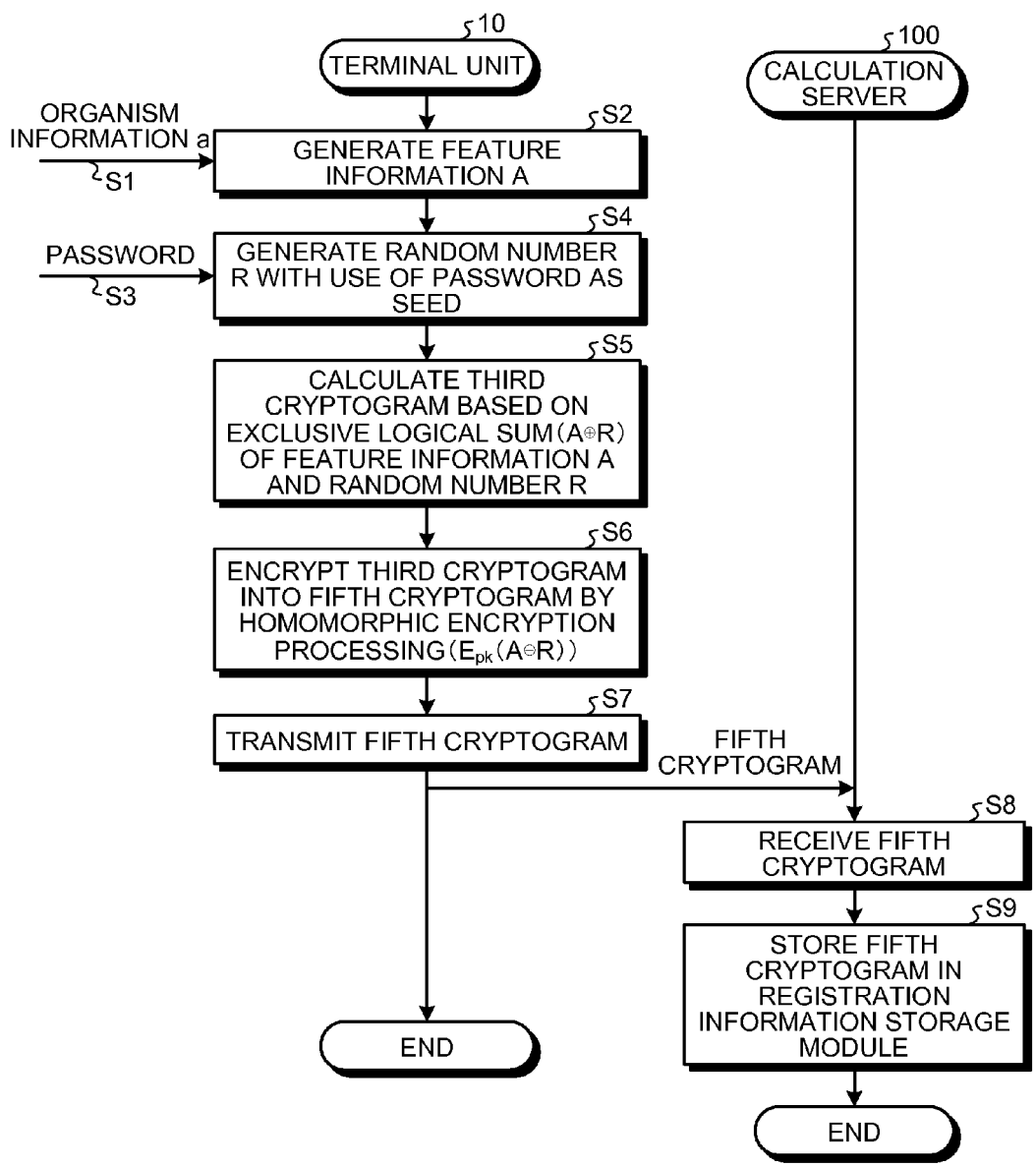
FIG. 3 is a sequence diagram illustrating one example of a registration operation of the authentication system in the first embodiment.

First, the explanation is made with respect to the case where organism information a of a user is registered with the authentication system 1. FIG. 3 is a sequence diagram illustrating one example of a registration operation of the authentication system in the first embodiment. Here, the explanation is made hereinafter by taking the case where a random number R is generated with the use of a password input by a user as a seed, as one example. The acquisition module 13 of the terminal unit 10 acquires organism information a of a user, and outputs the information to the controller 14 (Step S1). The generation module 15 of the controller 14 extracts, when the organism information a of the user is input from the acquisition module 13, a feature from the organism information a, and generates feature information A (feature vector A) (Step S2). The generation module 15 outputs the generated feature information A to the calculation module 16.

Furthermore, the acquisition module 13 acquires a password input by the user, and outputs the password to the controller 14 (Step S3). The calculation module 16 of the controller 14 generates a random number R with the use of the password input as a seed (Step S4).

The calculation module 16 calculates, when feature information A is input from the generation module 15, a third cryptogram as a first cryptogram based on an exclusive logical sum of the feature information A and the random number R (Step S5). The calculation module 16 outputs the calculated third cryptogram to the encryption module 17.

The encryption module 17 performs, when the third cryptogram is input from the calculation module 16, homomorphic encryption processing by using a public key of homomorphic encryption that is distributed from the authentication server 200. The encryption module 17 encrypts the third cryptogram into a fifth cryptogram as a second cryptogram corresponding to the third cryptogram (Step S6). The encryption module 17 transmits the fifth cryptogram into which the third cryptogram is encrypted to the calculation server 100 via the communication module 11 (Step S7).

The communication module 110 of the calculation server 100 receives the fifth cryptogram from the terminal unit 10, and outputs the fifth cryptogram to the controller 130 (Step S8). The calculation module 131 of the controller 130 stores, when the fifth cryptogram is input from the communication module 110, the fifth cryptogram in the registration information storage module 121 (Step S9). Accordingly, the feature information A based on the organism information a of the user can be registered with the authentication system 1.

Figure 4:
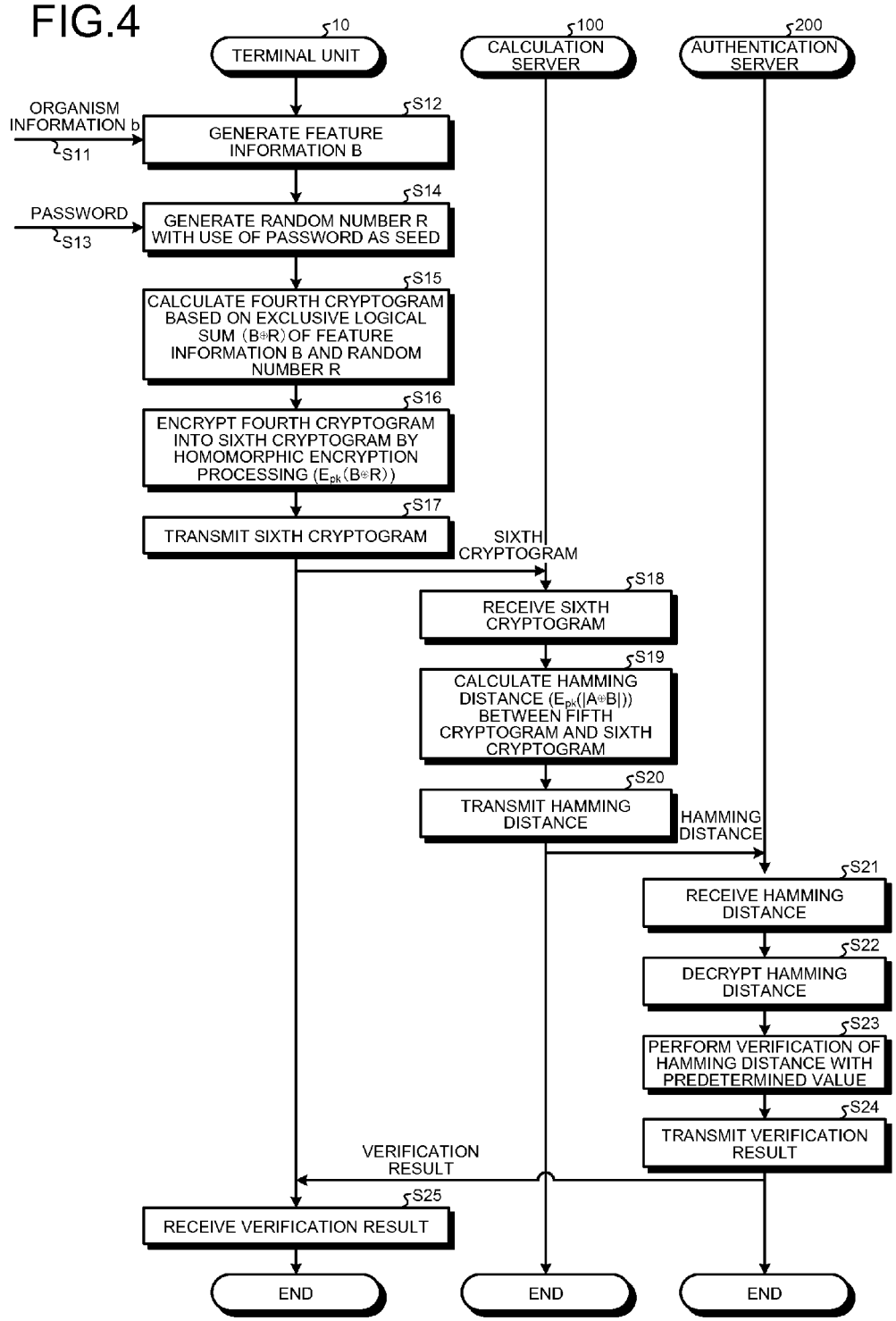
FIG. 4 is a sequence diagram illustrating one example of a verification operation of the authentication system in the first embodiment.

Next, the explanation is made with respect to the case where organism information b of a user is authenticated by using the authentication system 1. FIG. 4 is a sequence diagram illustrating one example of a verification operation of the authentication system in the first embodiment. Here, the explanation is made hereinafter, in the same manner as in registration, by taking the case where a random number R is generated with the use of a password input by a user as a seed, as a one example. The acquisition module 13 of the terminal unit 10 acquires organism information b of a user, and outputs the information to the controller 14 (Step S11). The generation module 15 of the controller 14 extracts, when the organism information b of the user is input from the acquisition module 13, a feature from the organism information b, and generates feature information B (feature vector B) (Step S12). The generation module 15 outputs the generated feature information B to the calculation module 16.

Furthermore, the acquisition module 13 acquires the password input by the user, and outputs the password to the controller 14 (Step S13). The calculation module 16 of the controller 14 generates the random number R with the use of the password input as a seed (Step S14). Here, in verification, a random number R generated with the use of a password identical with a password input in registration is identical with a random number R generated in registration.

The calculation module 16 calculates, when the feature information B is input from the generation module 15, a fourth cryptogram as the first cryptogram based on an exclusive logical sum of the feature information B and the random number R (Step S15). The calculation module 16 outputs the calculated fourth cryptogram to the encryption module 17.

The encryption module 17 performs, when the fourth cryptogram is input from the calculation module 16, homomorphic encryption processing by using a public key of homomorphic encryption that is distributed from the authentication server 200. The encryption module 17 encrypts the fourth cryptogram into the sixth cryptogram as the second cryptogram corresponding to the fourth cryptogram (Step S16). The encryption module 17 transmits the encrypted sixth cryptogram to the calculation server 100 via the communication module 11 (Step S17).

The communication module 110 of the calculation server 100 receives the sixth cryptogram from the terminal unit 10, and outputs the sixth cryptogram to the controller 130 (Step S18). The calculation module 131 of the controller 130 reads out, when the sixth cryptogram is input from the communication module 110, the fifth cryptogram corresponding to the user of the sixth cryptogram from the registration information storage module 121 to calculate the Hamming distance between the fifth cryptogram and the sixth cryptogram (Step S19). The calculation module 131 transmits the calculated Hamming distance to the authentication server 200 via the communication module 110 (Step S20).

The communication module 210 of the authentication server 200 receives the Hamming distance from the calculation server 100 (Step S21). The communication module 210 outputs the received Hamming distance to the controller 230. The determination module 231 of the controller 230 decrypts, when the Hamming distance is input from the communication module 210, the Hamming distance with a secret key of the homomorphic encryption (Step S22). The determination module 231 performs verification of the Hamming distance decrypted into a plaintext and a predetermined value (Step S23). That is, the determination module 231 determines whether the Hamming distance decrypted into the plaintext is less than the predetermined value. The determination module 231 determines the Hamming distance to be authenticated when the Hamming distance decrypted into the plaintext is less than the predetermined value (affirmative). The determination module 231 determines the Hamming distance not to be authenticated when the Hamming distance decrypted into the plaintext is equal to or more than the predetermined value (negative). The determination module 231 transmits the contents of determination as a verification result to the terminal unit 10 via the communication module 210 (Step S24).

The communication module 11 of the terminal unit 10 receives the verification result from the authentication server 200, and outputs the received verification result to the controller 14 (Step S25). The controller 14 performs, when the verification result is input from the communication module 11, processing corresponding to the verification result. Accordingly, verification of the feature information A of the user that is registered with the authentication system 1 with the newly input feature information B can be performed.

In this manner, the terminal unit 10 generates feature information based on organism information of a user. Furthermore, the terminal unit 10 calculates the first cryptogram based on the exclusive logical sum of the feature information generated and a random number. In addition, the terminal unit 10 encrypts the first cryptogram into the second cryptogram by using the cryptographic algorithm capable of calculating a Hamming distance in an encrypted state. As a result, the organism information can be kept secret from the authentication server 200.

Furthermore, the terminal unit 10 encrypts the first cryptogram into the second cryptogram by using homomorphic encryption as the cryptographic algorithm. As a result, a Hamming distance can be calculated in a state that feature information according to organism information of a user is encrypted.

Furthermore, the terminal unit 10 calculates the first cryptogram by using a random number unique to a user as the random number R. As a result, security intensity can be improved.

The terminal unit 10 generates feature information when the feature information based on organism information of a user is registered, and calculates the first cryptogram based on the exclusive logical sum of the feature information generated and the random number. Furthermore, the terminal unit 10 encrypts the first cryptogram into the second cryptogram by using the cryptographic algorithm capable of calculating the Hamming distance in an encrypted state. In addition, the terminal unit 10 generates feature information when verification of the feature information is performed, calculates the first cryptogram based on the exclusive logical sum of the feature information generated and the random number, and encrypts the first cryptogram into the second cryptogram by using the cryptographic algorithm capable of calculating the Hamming distance in an encrypted state. As a result, double encryption is performed in registration and verification of the feature information and hence, organism information can be kept secret from the authentication server 200 more firmly.

In the above-mentioned first embodiment, although the homomorphic encryption is performed with respect to the feature information according to organism information of a user in registration and verification in the terminal unit 10, the first embodiment is not limited to this example. For example, in the terminal unit 10, the following processes may be further performed; that is, processing that controls the execution of encryption processing is performed, homomorphic encryption with respect to feature information according to organism information of a user is, for example, omitted in verification, and only XOR encryption that calculates an exclusive logical sum is performed.

[b] Second Embodiment

The explanation is made hereinafter with respect to an example that homomorphic encryption with respect to feature information according to organism information of a user is omitted in verification, and only XOR encryption that calculates an exclusive logical sum is performed, in a second embodiment of the present invention. Here, parts having constitutions identical with the case of the terminal unit 10 and the calculation server 100 in the above-mentioned first embodiment are given same numerals, and their duplicated explanations are omitted. The difference of a terminal unit 20 of the second embodiment from the terminal unit 10 of the embodiment lies in that in verification, the homomorphic encryption with respect to the feature information according to organism information of a user is omitted, and only the XOR encryption that calculates the exclusive logical sum is performed.

Figure 5:
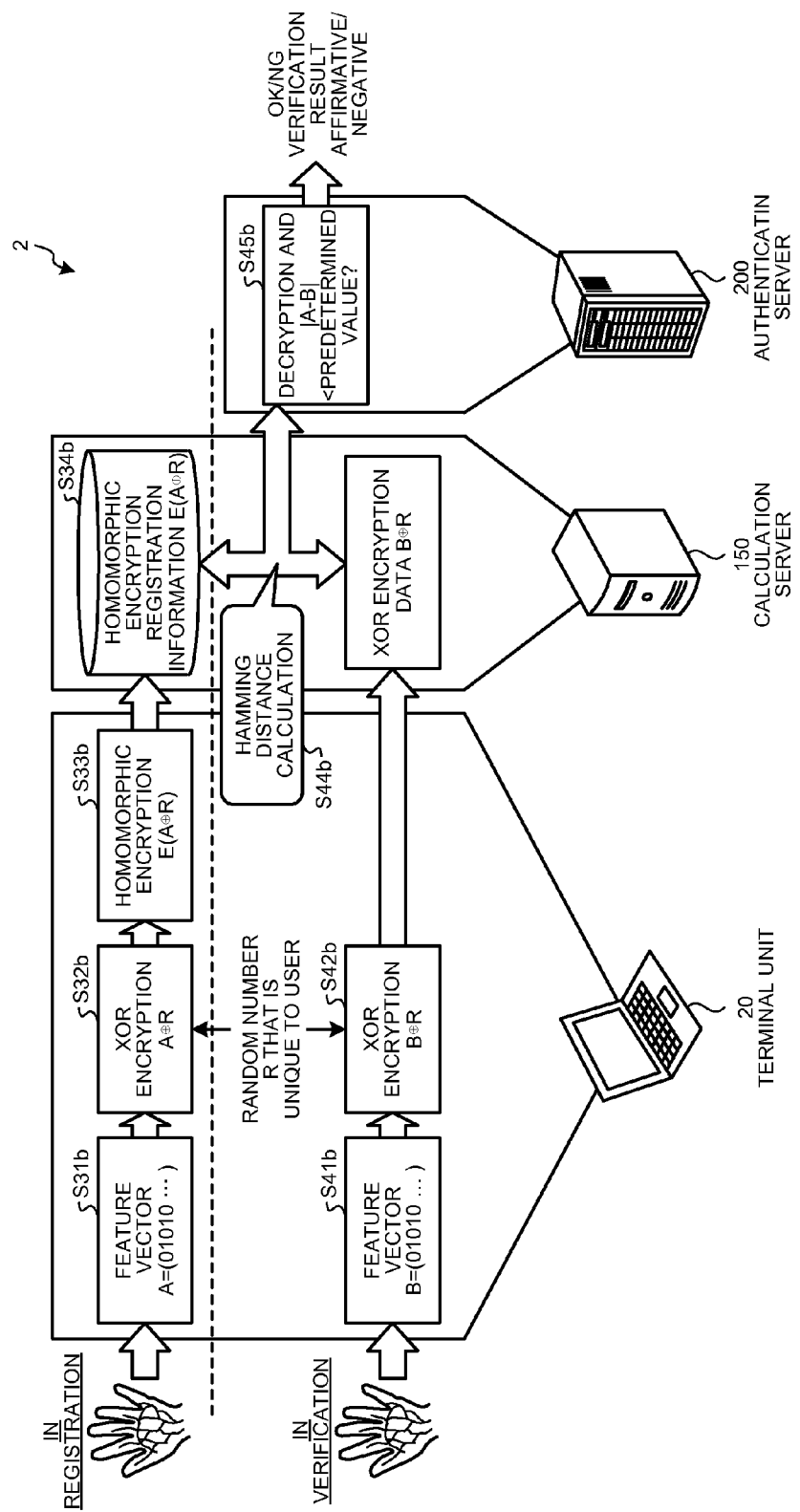
FIG. 5 is an explanatory view for explaining the outline of an authentication system in a second embodiment of the present invention.

First, the outline of an authentication system in the second embodiment is explained in conjunction with FIG. 5. FIG. 5 is an explanatory view for explaining the outline of the authentication system in the second embodiment. An authentication system 2 in the second embodiment illustrated in FIG. 5 differs from the authentication system 1 in the first embodiment in that homomorphic encryption processing corresponding to Step S43a is omitted, and the terminal unit 20 transmits the fourth cryptogram to a calculation server 150 as the first cryptogram (Step S42b). Furthermore, the authentication system 2 in the second embodiment differs from the authentication system 1 in the first embodiment in that a Hamming distance between a fourth cryptogram and a fifth cryptogram is calculated (Step S44b).

The terminal unit 20 is a terminal unit that performs registration and verification of organism information of a user in the authentication system 2. The terminal unit 20 acquires, when the registration of organism information is performed, organism information of a user, and encrypts the acquired organism information in two steps of XOR encryption and homomorphic encryption to transmit the encrypted organism information to a calculation server 150. Furthermore, the terminal unit 20 acquires, when the verification of organism information is performed, organism information of a user, and encrypts the acquired organism information in one step of XOR encryption to transmit the encrypted organism information to the calculation server 150.

Steps S31b to S34b that are operations in registration of organism information are respectively identical with Steps S31a to S34a of the authentication system 1 in the first embodiment and their duplicated explanations are omitted. Steps S41b and S45b that are operations in verification of organism information are respectively identical with Steps S41a and S45a of the authentication system 1 in the first embodiment and their duplicated explanations are omitted. The terminal unit 20 calculates an exclusive logical sum of a feature vector B and a random number R that is unique to a user and generated based on a password or the like specified by a user, performs XOR encryption to calculates a fourth cryptogram, and transmits the calculated fourth cryptogram to the calculation server 150 (Step S42b).

The calculation server 150 calculates, when receiving the fourth cryptogram from the terminal unit 20, a Hamming distance between the fourth cryptogram and the fifth cryptogram stored as registration information in an encrypted state, and transmits the calculated Hamming distance to the authentication server 200 (Step S44b). The operations of the authentication server 200 are identical with those of the authentication server 200 in the first embodiment and their duplicated explanations are omitted. In the second embodiment, only the XOR encryption is performed with respect to the feature information in verification and hence, the encryption in verification and the calculation of the Hamming distance can be performed faster.

Figure 6:
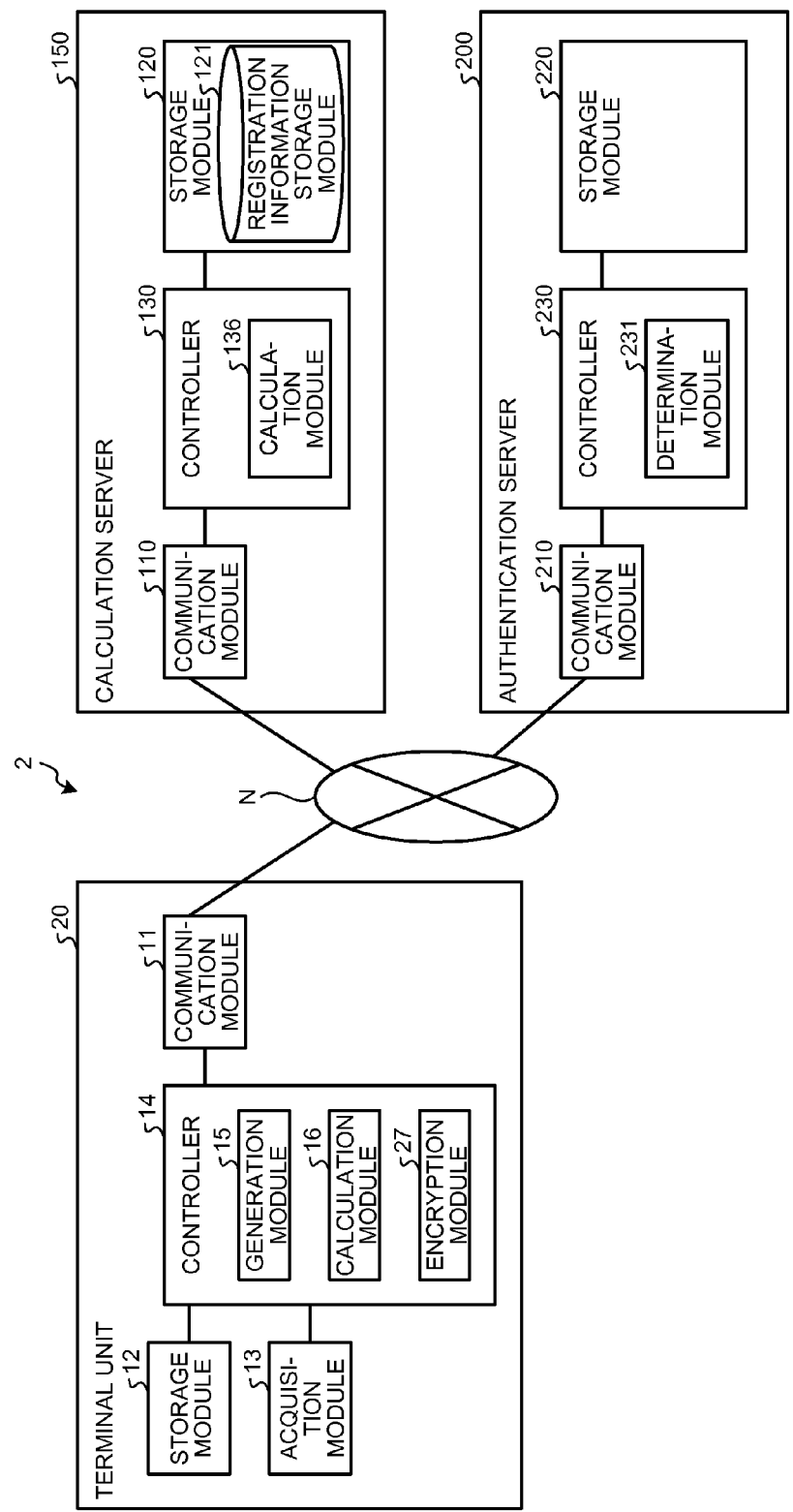
FIG. 6 is a block diagram illustrating one example of a configuration of the authentication system in the second embodiment.

Next, a configuration of the authentication system 2 in the second embodiment is explained in conjunction with FIG. 6. The authentication system 2 in the second embodiment has the terminal unit 20 in place of the terminal unit 10 of the authentication system 1 in the first embodiment. Furthermore, the terminal unit 20 in the second embodiment differs from the terminal unit 10 in the first embodiment in that the terminal unit 20 has an encryption module 27 in place of the encryption module 17 and that a cryptogram passing through the communication module 11 varies.

In addition, the authentication system 2 in the second embodiment has a calculation server 150 in place of the calculation server 100 of the authentication system 1 in the first embodiment. Furthermore, the calculation server 150 in the second embodiment differs from the calculation server 100 in the first embodiment in that the calculation server 150 has a calculation module 136 in place of the calculation module 131 and that a cryptogram passing through the communication module 110 varies. Here, the communication module 11 of the terminal unit 20 differs from the communication module 110 of the calculation server 150 only in that a cryptogram varies depending on whether to be processed in the encryption module 27 or in the calculation module 136 and that their explanations are omitted.

The encryption module 27 of the terminal unit 20 inputs thereto the third cryptogram or the fourth cryptogram as the first cryptogram from the calculation module 16. The encryption module 27 encrypts the third cryptogram into the fifth cryptogram as the second cryptogram corresponding to the third cryptogram by using a public key of homomorphic encryption. The encryption module 27 may use lattice-based homomorphic encryption such as Ideal lattices or Ring-LWE as an algorithm that performs encryption. Here, a public key distributed from the authentication server 200 in advance is used for the public key of the homomorphic encryption. In the encryption module 27, when the fourth cryptogram is input, homomorphic encryption processing is not performed.

The encryption module 27 transmits the fifth cryptogram into which the third cryptogram is encrypted or the input fourth cryptogram as it is to the calculation server 150 via the communication module 11. That is, the encryption module 27 transmits, in registration of the feature information based on organism information of a user, the fifth cryptogram to the calculation server 150 via the communication module 11 as the second cryptogram. Furthermore, the encryption module 27 transmits, in verification of the feature information based on organism information of a user, the fourth cryptogram to the calculation server 150 via the communication module 11 as the first cryptogram.

The calculation module 136 of the calculation server 150 stores, when the fifth cryptogram is input from the communication module 110, the 5th cryptogram in the registration information storage module 121. The calculation module 136 reads out, when the fourth cryptogram is input from the communication module 110, the fifth cryptogram corresponding to the user of the fourth cryptogram from the registration information storage module 121 to calculate the Hamming distance between the fourth cryptogram and the fifth cryptogram.

Here, the explanation is made with respect to the reduction of the calculating time of the Hamming distance. First, the encryption can be expressed by expression (7) and expression (8) that are described below when a cryptogram of a plaintext m is expressed as the following expression (6). Here, each of symbols u, g, and f indicates a random number in encrypting, a symbol t indicates a modulus of a plaintext space, and a symbol q indicates a modulus of a cryptogram space. Furthermore, a symbol "in Rq" indicates a set of modulo q polynomial ring, where the symbol q indicates a prime number.

$$E_{pk}(m)=(C_0, C_1) \tag{6}$$

$$c_0 = a_0 u + tg + m (\text{in } Rq) \tag{7}$$

$$c_1 = a_1 u + tf (\text{in } Rq) \tag{8}$$

When a secret key $sk_1=s$, and a public key $pk_1=(a_0, a_1)$, $a_0$ can be expressed by the following expression (9). Here, symbols $a_1$ and e indicate random numbers in generation of a key.

$$a_0 = -(a_1 s + te) \text{in } Rq \tag{9}$$

In general cryptogram processing; that is, in calculation of a Hamming distance, multiplication processing of a cryptogram with respect to plaintexts m and m' such that m=AxorR and m'=BxorR performs a calculation of multiplying a polynomial by a polynomial four times, as described in the following expression (10).

$$E_{pk}(m) \times E_{pk}(m')=(c_0,c_1) \times (c'_0,c'_1)=(c_0c'_0, c'_0c_1+c_1c'_0, c_1c'_1) \quad (10)$$

On the other hand, in cryptogram processing of second embodiment; that is, in calculation of a Hamming distance, as described in the following expression (11), a calculation of multiplying a polynomial by a constant is performed twice and hence, a processing cost can be reduced substantially compared with the case of expression (10). For example, in the second embodiment, a processing time can be reduced in the calculation server 150 roughly several ten times as compared with the first embodiment. Here, (BxorR) is a polynomial whose value is far smaller than $c_0$ or $c_1$ of the second cryptogram.

$$E_{pk}(m) \times (B \oplus R)=(c_0(B \oplus R), c_1(B \oplus R)) \quad (11)$$

The calculation module 136 transmits the calculated Hamming distance to the authentication server 200 via the communication module 110.

Next, the explanation is made with respect to the operation of the authentication system 2 in the second embodiment.

Figure 7:
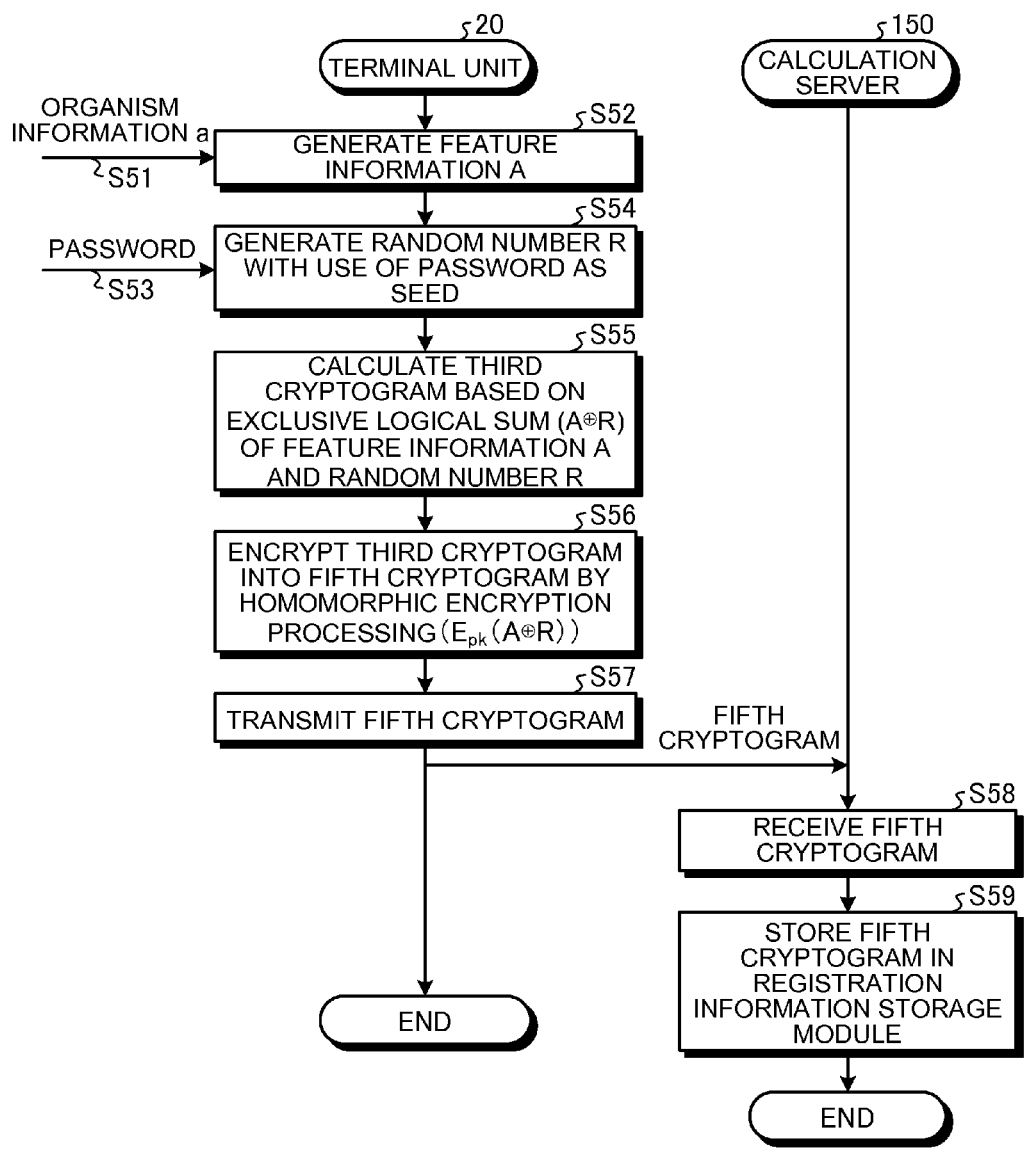
FIG. 7 is a sequence diagram illustrating one example of a registration operation of the authentication system in the second embodiment.

First, the explanation is made with respect to the case where organism information a of a user is registered with the authentication system 2. FIG. 7 is a sequence diagram illustrating one example of a registration operation of the authentication system in the second embodiment. Here, the explanation is made hereinafter by taking the case where a random number R is generated with the use of a password input by a user as a seed, as one example. The acquisition module 13 of the terminal unit 20 acquires organism information a of a user, and outputs the information to the controller 14 (Step S51). The generation module 15 of the controller 14 extracts, when the organism information a of the user is input from the acquisition module 13, a feature from the organism information a, and generates feature information A (feature vector A) (Step S52). The generation module 15 outputs the generated feature information A to the calculation module 16.

Furthermore, the acquisition module 13 acquires the password input by the user, and outputs the password to the controller 14 (Step S53). The calculation module 16 of the controller 14 generates a random number R with the use of the password input as a seed (Step S54).

The calculation module 16 calculates, when the feature information A is input from the generation module 15, a third cryptogram as a first cryptogram based on the exclusive logical sum of the feature information A and the random number R (Step S55). The calculation module 16 outputs the calculated third cryptogram to the encryption module 27.

The encryption module 27 performs, when the third cryptogram is input from the calculation module 16, homomorphic encryption processing by using a public key of homomorphic encryption that is distributed from the authentication server 200. The encryption module 27 encrypts the third cryptogram into a fifth cryptogram as a second cryptogram corresponding to the third cryptogram (Step S56). The encryption module 27 transmits the fifth cryptogram into which the third cryptogram is encrypted to the calculation server 150 via the communication module 11 (Step S57).

The communication module 110 of the calculation server 150 receives the fifth cryptogram from the terminal unit 20, and outputs the fifth cryptogram to the controller 130 (Step S58). The calculation module 131 of the controller 130 stores, when the fifth cryptogram is input from the communication module 110, the fifth cryptogram in the registration information storage module 121 (Step S59). Accordingly, the feature information A based on the organism information a of the user can be registered with the authentication system 2.

Figure 8:
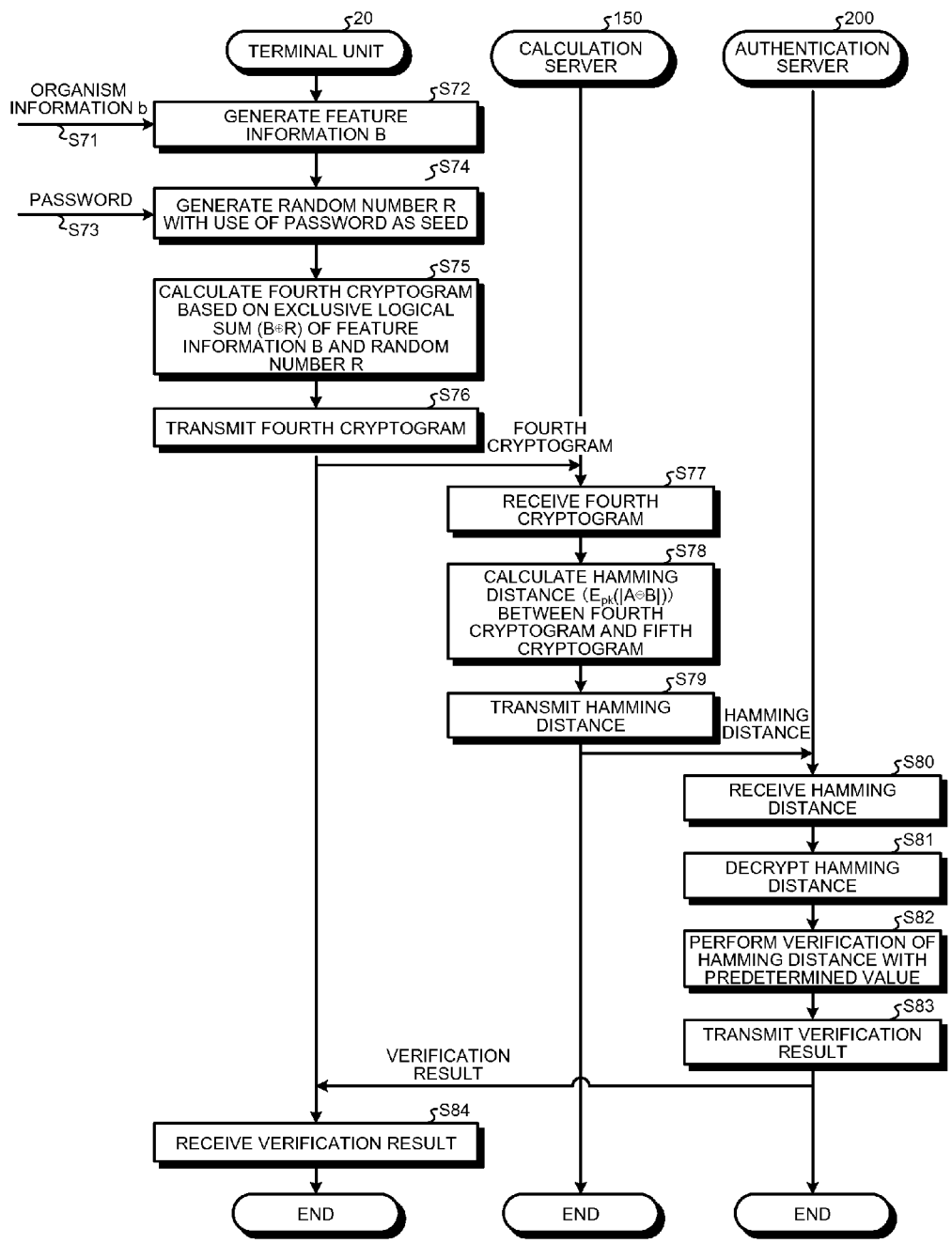
FIG. 8 is a sequence diagram illustrating one example of a verification operation of the authentication system in the second embodiment.

Next, the explanation is made with respect to the case where organism information b of a user is authenticated by using the authentication system 2. FIG. 8 is a sequence diagram illustrating one example of a verification operation of the authentication system in the second embodiment. Here, the explanation is made hereinafter, in the same manner as in registration, by taking the case where a random number R is generated with the use of a password input by a user as a seed, as a one example. The acquisition module 13 of the terminal unit 20 acquires organism information b of a user, and outputs the information to the controller 14 (Step S71). The generation module 15 of the controller 14 extracts, when the organism information b of the user is input from the acquisition module 13, a feature from the organism information b, and generates feature information B (feature vector B) (Step S72). The generation module 15 outputs the generated feature information B to the calculation module 16.

Furthermore, the acquisition module 13 acquires the password input by the user, and outputs the password to the controller 14 (Step S73). The calculation module 16 of the controller 14 generates the random number R with the use of the password input as a seed (Step S74). Here, in verification, a random number R generated with the use of a password identical with a password input in registration is identical with a random number R generated in registration.

The calculation module 16 calculates, when the feature information B is input from the generation module 15, a fourth cryptogram as a first cryptogram based on the exclusive logical sum of the feature information B and the random number R (Step S75). The calculation module 16 outputs the calculated fourth cryptogram to the encryption module 27.

The encryption module 27 transmits, when the fourth cryptogram is input from the calculation module 16, the input fourth cryptogram to the calculation server 150 via the communication module 11 as it is (Step S76).

The communication module 110 of the calculation server 150 receives the fourth cryptogram from the terminal unit 20, and outputs the fourth cryptogram to the controller 130 (Step S77). The calculation module 136 of the controller 130 reads out, when the fourth cryptogram is input from the communication module 110, a fifth cryptogram corresponding to the user of the fourth cryptogram from the registration information storage module 121 to calculate a Hamming distance between the fourth cryptogram and the fifth cryptogram (Step S78). The calculation module 136 transmits the calculated Hamming distance to the authentication server 200 via the communication module 110 (Step S79).

The communication module 210 of the authentication server 200 receives the Hamming distance from the calculation server 150 (Step S80). The communication module 210 outputs the received Hamming distance to the controller 230. The determination module 231 of the controller 230 decrypts, when the Hamming distance is input from the communication module 210, the Hamming distance with a secret key of the homomorphic encryption (Step S81). The determination module 231 performs verification of the Hamming distance decrypted into a plaintext and a predetermined value (Step S82). That is, the determination module 231 determines whether the Hamming distance decrypted into the plaintext is less than a predetermined value. The determination module 231 determines the Hamming distance to be authenticated when the Hamming distance decrypted into the plaintext is less than a predetermined value (affirmative). The determination module 231 determines the Hamming distance not to be authenticated when the Hamming distance decrypted into the plaintext is equal to or more than the predetermined value (negative). The determination module 231 transmits the contents of determination as a verification result to the terminal unit 20 via the communication module 210 (Step S83).

The communication module 11 of the terminal unit 20 receives the verification result from the authentication server 200, and outputs the received verification result to the controller 14 (Step S84). The controller 14 performs, when the verification result is input from the communication module 11, processing corresponding to the verification result. Accordingly, verification of the feature information A of the user registered with the authentication system 2 with the newly input feature information B can be performed faster.

In this manner, the terminal unit 20 generates feature information when the feature information based on organism information of a user is registered, and calculates the first cryptogram based on the exclusive logical sum of the feature information generated and a random number. Furthermore, the terminal unit 20 encrypts the first cryptogram into the second cryptogram by using a cryptographic algorithm capable of calculating a Hamming distance in an encrypted state. The terminal unit 20 generates feature information when verification of the feature information is performed, and calculates the first cryptogram based on the exclusive logical sum of the feature information generated and a random number. As a result, verification of organism information can be performed faster, and the organism information can be kept secret from an authentication server.

In the above-mentioned first embodiment, although homomorphic encryption is performed with respect to the feature information according to organism information of a user in registration and verification in the terminal unit 10, the first embodiment is not limited to this example. Furthermore, in the above-mentioned second embodiment, although homomorphic encryption is performed with respect to the feature information according to organism information of a user in registration in the terminal unit 20, the second embodiment is not limited to this example. For example, in the terminal unit 10, the following processes may be performed; that is, processing that controls the execution of encryption processing is further performed, homomorphic encryption of feature information according to organism information of a user is, for example, omitted in registration, and only XOR encryption that calculates an exclusive logical sum is performed.

[c] Third Embodiment

The explanation is made hereinafter with respect to an example in which homomorphic encryption of feature information according to organism information of a user is omitted in registration, and only XOR encryption that calculates an exclusive logical sum is performed, in a third embodiment of the present invention. Here, parts having constitutions identical with the case of the terminal unit 10 and the calculation server 100 in the above-mentioned first embodiment are given same numerals, and their duplicated explanations are omitted. The difference of a terminal unit 30 in the third embodiment from the terminal unit 10 in the first embodiment lies in that the homomorphic encryption of the feature information according to organism information of a user is omitted in registration, and only the XOR encryption that calculates the exclusive logical sum is performed.

Figure 9:
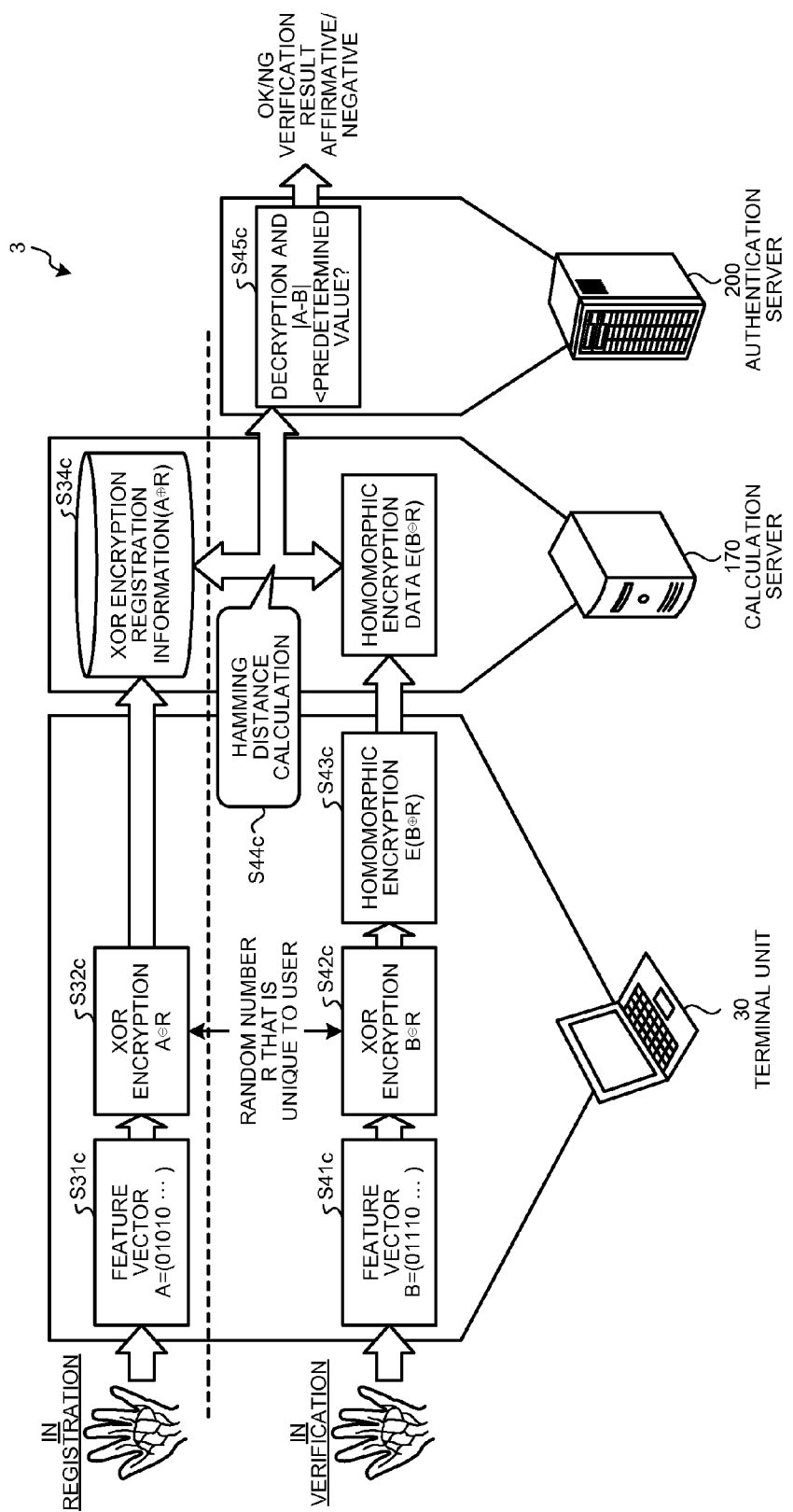
FIG. 9 is an explanatory view for explaining the outline of an authentication system in a third embodiment of the present invention.

First, the outline of an authentication system in the third embodiment is explained in conjunction with FIG. 9. FIG. 9 is an explanatory view for explaining the outline of the authentication system in the third embodiment. The difference of an authentication system 3 in the third embodiment illustrated in FIG. 9 from the authentication system 1 in the first embodiment lies in that homomorphic encryption processing corresponding to step S33a is omitted, and the terminal unit 30 transmits the third cryptogram to a calculation server 170 as the first cryptogram (Step S32c). Furthermore, the authentication system 3 in the third embodiment differs from the authentication system 1 in the first embodiment in that the Hamming distance between the third cryptogram and the sixth cryptogram is calculated (Step S44b).

The terminal unit 30 is a terminal unit that performs registration and verification of organism information of a user in the authentication system 3. The terminal unit 30 acquires, when the registration of organism information is performed, organism information of a user, encrypts the acquired organism information in one step of XOR encryption, and transmits the encrypted organism information to the calculation server 170. Furthermore, the terminal unit 30 acquires, when verification of organism information is performed, organism information of a user, encrypts the acquired organism information in two steps of the XOR encryption and homomorphic encryption, and transmits the encrypted organism information to a calculation server 170.

Step S31c that is an operation in registration of organism information is identical with Step S31a of the authentication system 1 in the first embodiment and its explanation is omitted. Steps S41c to S43c, and S45c that are operations in verification of organism information are respectively identical with steps S41a to S43a, and S45a of the authentication system 1 in the first embodiment and their duplicated explanations are omitted. The terminal unit 30 calculates an exclusive logical sum of a feature vector A and a random number R that is unique to a user and generated based on a password or the like specified by the user, performs the XOR encryption to calculate the third cryptogram, and transmits the calculated third cryptogram to the calculation server 170 (Step S32c). The calculation server 170 receives the third cryptogram from the terminal unit 30, and stores the third cryptogram as registration information (Step S34c).

The calculation server 170 receives the sixth cryptogram as the second cryptogram from the terminal unit 30, and calculates a Hamming distance between the sixth cryptogram and the third cryptogram stored as registration information in an encrypted state. The calculation server 170 transmits the calculated Hamming distance to the authentication server 200 (Step S44c). The operations of the authentication server 200 are identical with those of the authentication server 200 in the first embodiment and their duplicated explanations are omitted. In the third embodiment, only the XOR encryption is performed with respect to the feature information in registration and hence, the encryption in registration and the calculation of the Hamming distance can be performed faster.

Figure 10:
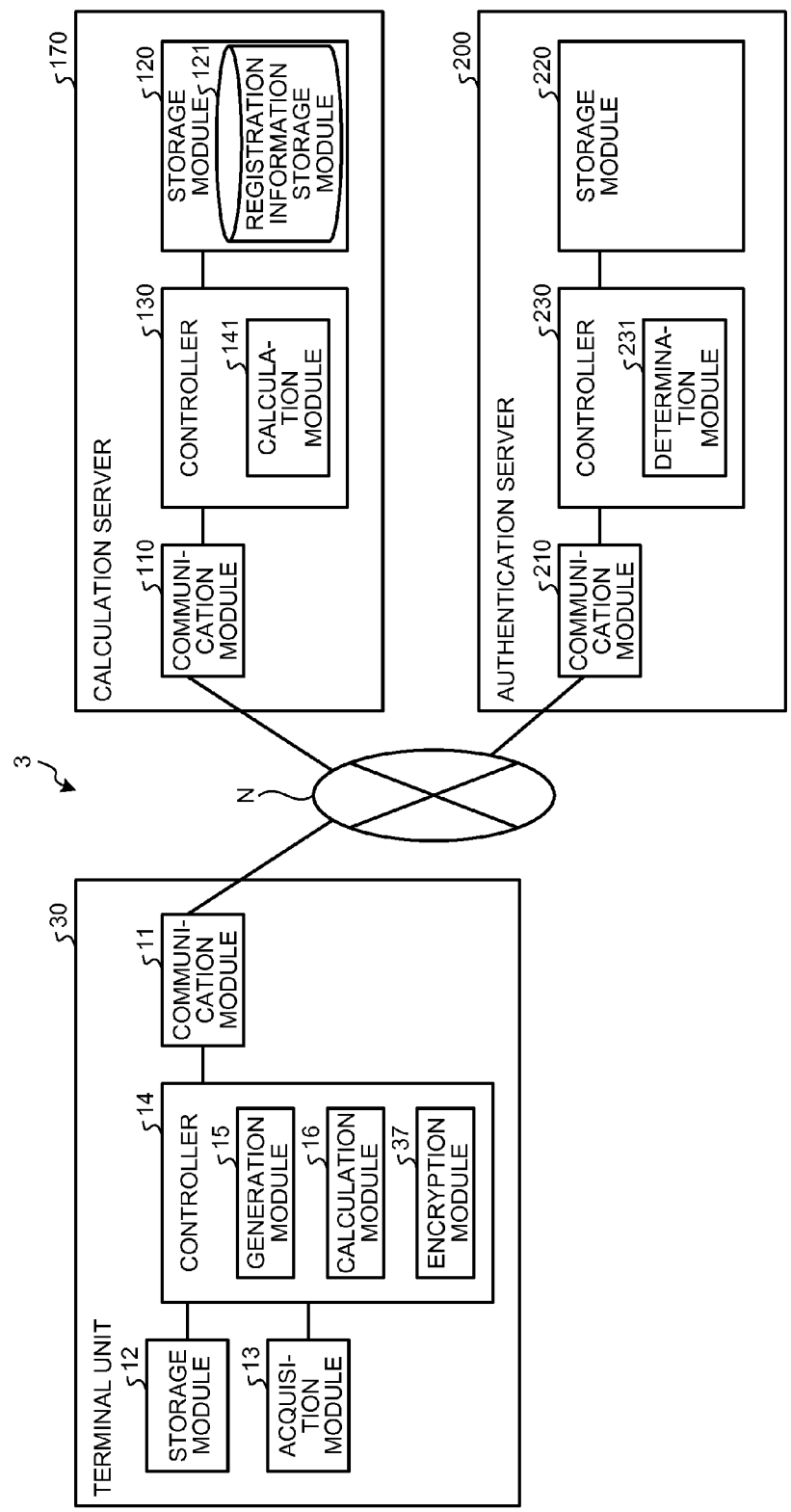
FIG. 10 is a block diagram illustrating one example of a configuration of the authentication system in the third embodiment.

Next, a configuration of the authentication system 3 in the third embodiment is explained in conjunction with FIG. 10. The authentication system 3 in the third embodiment has the terminal unit 30 in place of the terminal unit 10 of the authentication system 1 in the first embodiment. Furthermore, the terminal unit 30 in the first embodiment differs from the terminal unit 10 in the first embodiment in that the terminal unit 30 has an encryption module 37 in place of the encryption module 17 and that a cryptogram passing through the communication module 11 varies.

In addition, the authentication system 3 in the third embodiment has the calculation server 170 in place of the calculation server 100 of the authentication system 1 in the first embodiment. The calculation server 170 in the third embodiment also differs from the calculation server 100 in the first embodiment in that the calculation server 170 has a calculation module 141 in place of the calculation module 131 and that a cryptogram passing through the communication module 110 varies. Here, the communication module 11 of the terminal unit 30 differs from the communication module 110 of the calculation server 170 only in that a cryptogram varies depending on whether to be processed in the encryption module 37 or in the calculation module 141 and that their explanations are omitted.

The encryption module 37 of the terminal unit 30 inputs thereto the third cryptogram or the fourth cryptogram as the first cryptogram from the calculation module 16. In the encryption module 37, when the third cryptogram is input, homomorphic encryption processing is not performed. The encryption module 37 encrypts the fourth cryptogram into a sixth cryptogram as the second cryptogram corresponding to the fourth cryptogram by using a public key of homomorphic encryption. The encryption module 37 may use lattice-based homomorphic encryption such as Ideal lattices or Ring-LWE as an encryption algorithm. Here, a public key distributed from the authentication server 200 in advance is used as the public key of the homomorphic encryption.

The encryption module 37 transmits the third cryptogram input as it is or the sixth cryptogram into which the fourth cryptogram is encrypted to the calculation server 170 via the communication module 11. That is, the encryption module 37 transmits, in registration of feature information based on organism information of a user, the third cryptogram to the calculation server 170 via the communication module 11 as the first cryptogram. Furthermore, the encryption module 37 transmits, in verification of the feature information based on the organism information of the user, the sixth cryptogram to the calculation server 170 via the communication module 11 as the second cryptograms.

The calculation module 141 of the calculation server 170 stores, when the third cryptogram is input from the communication module 110, the third cryptogram in the registration information storage module 121. The calculation module 141 reads out, when the sixth cryptogram is input from the communication module 110, the third cryptogram corresponding to the user of the sixth cryptogram from the registration information storage module 121 to calculate the Hamming distance between the third cryptogram and the sixth cryptogram. Here, the Hamming distance can be calculated in the same manner as the case of the second embodiment. The calculation module 141 transmits the calculated Hamming distance to the authentication server 200 via the communication module 110.

Next, the operation of the authentication system 3 in the third embodiment is explained.

Figure 11:
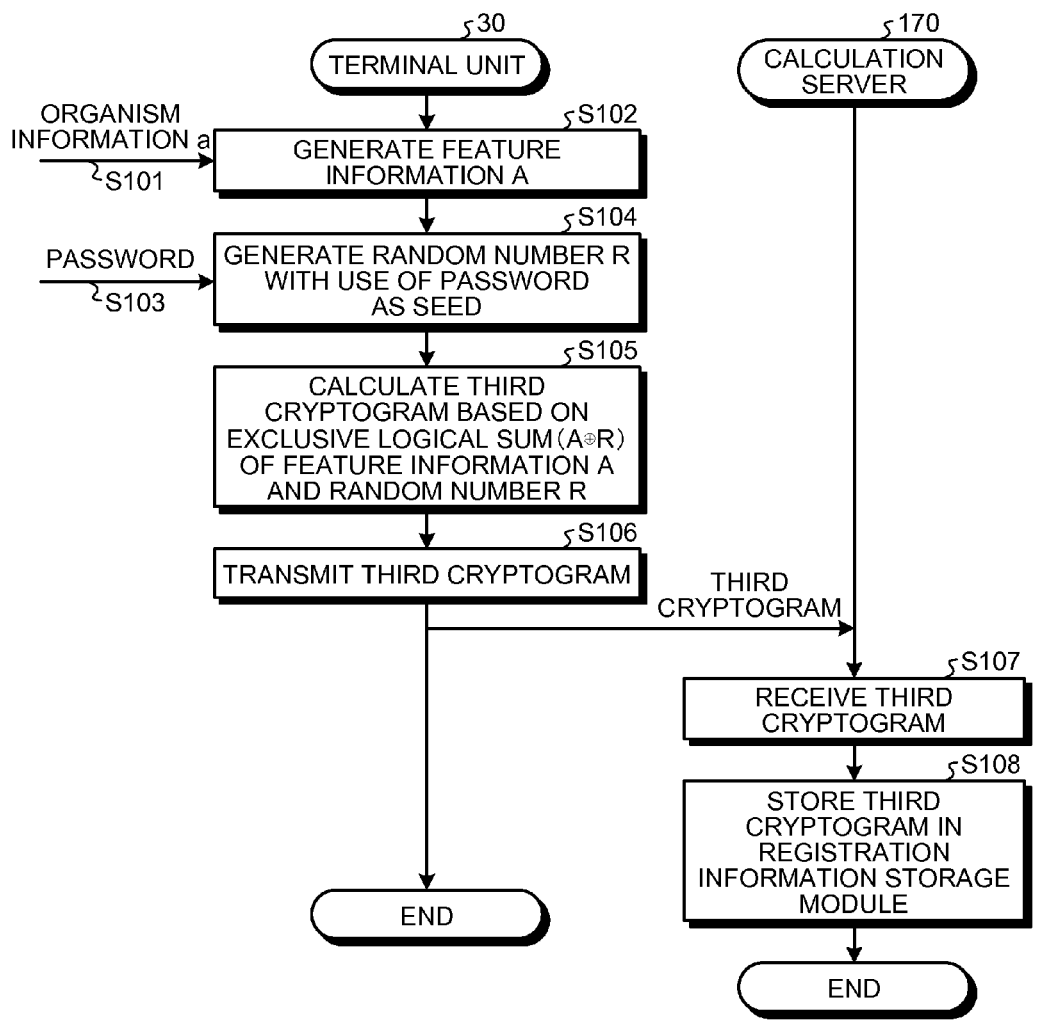
FIG. 11 is a sequence diagram illustrating one example of a registration operation of the authentication system in the third embodiment.

First, the explanation is made with respect to the case where organism information a of a user is registered with the authentication system 3. FIG. 11 is a sequence diagram illustrating one example of a registration operation of the authentication system in the third embodiment. Here, the explanation is made hereinafter by taking the case where a random number R is generated with the use of a password input by a user as a seed, as one example. The acquisition module 13 of the terminal unit 30 acquires organism information a of a user, and outputs the information to the controller 14 (Step S101). The generation module 15 of the controller 14 extracts, when the organism information a of the user is input from the acquisition module 13, a feature from the organism information a, and generates feature information A (feature vector A) (Step S102). The generation module 15 outputs the generated feature information A to the calculation module 16.

Furthermore, the acquisition module 13 acquires a password input by the user, and outputs the password to the controller 14 (Step S103). The calculation module 16 of the controller 14 generates a random number R with the use of the password input as a seed (Step S104).

The calculation module 16 calculates, when the feature information A is input from the generation module 15, a third cryptogram as a first cryptogram based on an exclusive logical sum of the feature information A and the random number R (Step S105). The calculation module 16 outputs the calculated third cryptogram to the encryption module 37.

The encryption module 37 transmits, when the third cryptogram is input from the calculation module 16, the input third cryptogram to the calculation server 170 via the communication module 11 as it is (Step S106).

The communication module 110 of the calculation server 170 receives the third cryptogram from the terminal unit 30, and outputs the third cryptogram to the controller 130 (Step S107). The calculation module 141 of the controller 130 stores, when the third cryptogram is input from the communication module 110, the third cryptogram in the registration information storage module 121 (Step S108). Accordingly, the feature information A based on the organism information a of the user can be registered with the authentication system 3.

Figure 12:
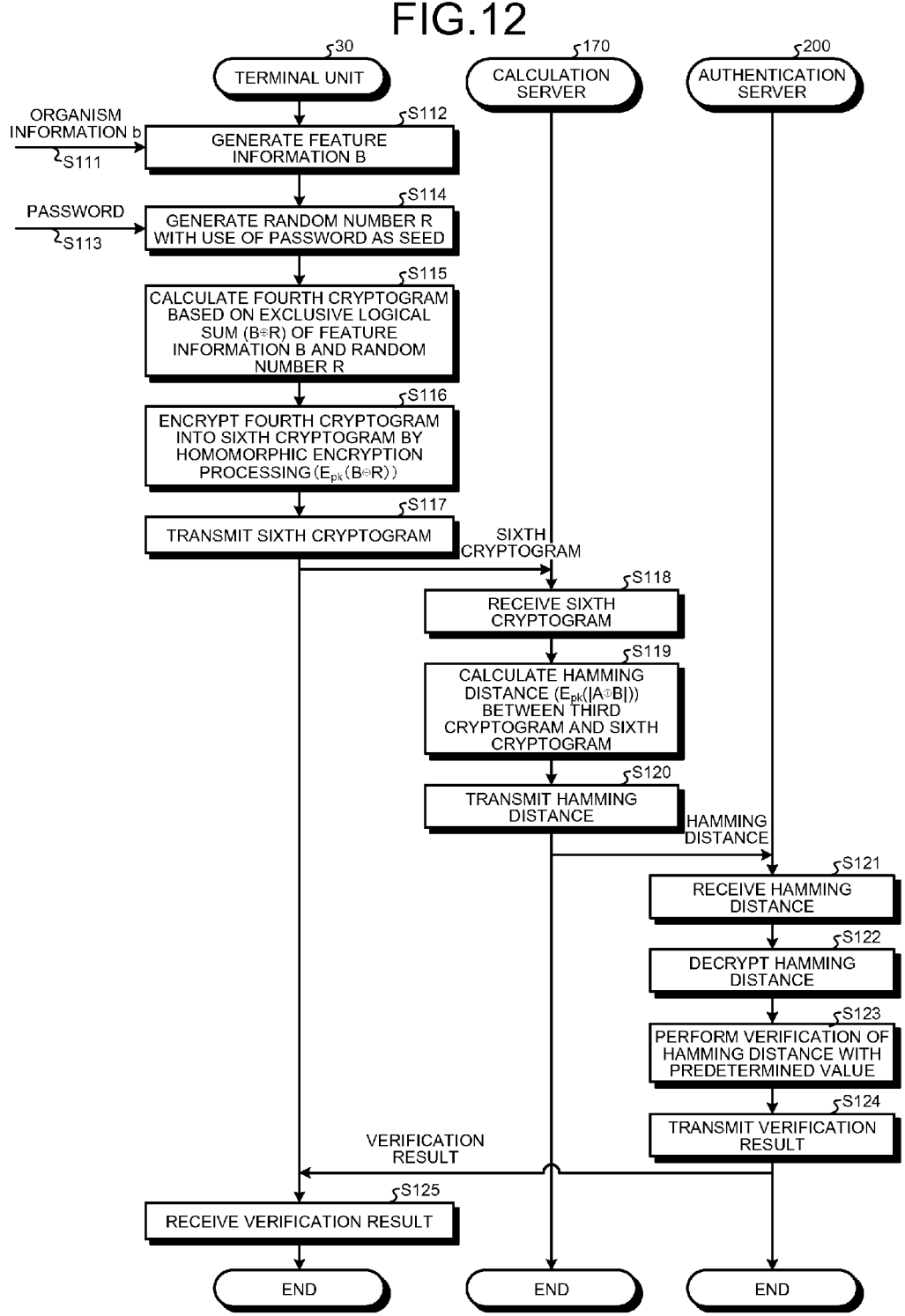
FIG. 12 is a sequence diagram illustrating one example of a verification operation of the authentication system in the third embodiment.

Next, the explanation is made with respect to the case where organism information b of a user is authenticated by using the authentication system 3. FIG. 12 is a sequence diagram illustrating one example of a verification operation of the authentication system in the third embodiment. Here, the explanation is made hereinafter, in the same manner as in registration, by taking the case where a random number R is generated with the use of a password input by a user as a seed, as a one example. The acquisition module 13 of the terminal unit 30 acquires organism information b of a user, and outputs the information to the controller 14 (Step S111). The generation module 15 of the controller 14 extracts, when the organism information b of the user is input from the acquisition module 13, a feature from the organism information b, and generates feature information B (feature vector B) (Step S112). The generation module 15 outputs the generated feature information B to the calculation module 16.

Furthermore, the acquisition module 13 acquires the password input by the user, and outputs the password to the controller 14 (Step S113). The calculation module 16 of the controller 14 generates a random number R with the use of the password input as a seed (Step S114). Here, in verification, a random number R generated with the use of a password identical with the password input in registration is identical with the random number R generated in registration.

The calculation module 16 calculates, when the feature information B is input from the generation module 15, a fourth cryptogram as the first cryptogram based on the exclusive logical sum of the feature information B and the random number R (Step S115). The calculation module 16 outputs the calculated fourth cryptogram to the encryption module 37.

The encryption module 37 performs, when the fourth cryptogram is input from the calculation module 16, homomorphic encryption processing by using a public key of homomorphic encryption distributed from the authentication server 200, and encrypts the fourth cryptogram into a sixth cryptogram as a second cryptogram corresponding to the fourth cryptogram (Step S116). The encryption module 37 transmits the sixth cryptogram into which the fourth cryptogram is encrypted to the calculation server 170 via the communication module 11 (Step S117).

The communication module 110 of the calculation server 170 receives the sixth cryptogram from the terminal unit 30, and outputs the sixth cryptogram to the controller 130 (Step S118). The calculation module 141 of the controller 130 reads out, when the sixth cryptogram is input from the communication module 110, the third cryptogram corresponding to the user of the sixth cryptogram from the registration information storage module 121 to calculate the Hamming distance between the third cryptogram and the sixth cryptogram (Step S119). The calculation module 141 transmits the calculated Hamming distance to the authentication server 200 via the communication module 110 (Step S120).

The communication module 210 of the authentication server 200 receives the Hamming distance from the calculation server 170 (Step S121). The communication module 210 outputs the received Hamming distance to the controller 230. The determination module 231 of the controller 230 decrypts, when the Hamming distance is input from the communication module 210, the Hamming distance with a secret key of the homomorphic encryption (Step S122). The determination module 231 performs verification of the Hamming distance decrypted into a plaintext with a predetermined value (Step S123). That is, the determination module 231 determines whether the Hamming distance decrypted into the plaintext is less than a predetermined value. The determination module 231 determines the Hamming distance to be authenticated when the Hamming distance decrypted into the plaintext is less than the predetermined value (affirmative). The determination module 231 determines the Hamming distance not to be authenticated when the Hamming distance decrypted into the plaintext is equal to or more than the predetermined value (negative). The determination module 231 transmits the contents of determination as a verification result to the terminal unit 30 via the communication module 210 (Step S124).

The communication module 11 of the terminal unit 30 receives the verification result from the authentication server 200, and outputs the received verification result to the controller 14 (Step S125). The controller 14 performs, when the verification result is input from the communication module 11, processing corresponding to the verification result. Accordingly, verification of the feature information A of the user registered with the authentication system 3 with the newly input feature information B can be performed.

In this manner, the terminal unit 30 generates, when feature information based on organism information of a user is registered, the feature information, and calculates the first cryptogram based on the exclusive logical sum of the feature information generated and a random number. The terminal unit 30 also generates feature information when verification of the feature information is performed, and calculates the first cryptogram based on the exclusive logical sum of the feature information generated and a random number. Furthermore, the terminal unit 30 encrypts the first cryptogram into the second cryptogram by using the cryptographic algorithm capable of calculating the Hamming distance in an encrypted state. As a result, organism information can be registered faster, and the organism information can be kept secret from the authentication server 200.

In the respective above-mentioned embodiments, although the terminal units 10, 20, and 30 each of which is a terminal operated by a user and the authentication server 200 are arranged in a distributed manner, the present invention is not limited to these embodiments. For example, each of the terminal units 10, 20, and 30 may read an IC card or the like that is managed by a user and stores therein a secret key to perform verification of a Hamming distance in place of the authentication server 200. Accordingly, biometric authentication can be performed without notifying even the authentication server 200 of a secret key.

Furthermore, in the respective above-mentioned embodiments, although the calculation servers 100, 150, and 170 are provided for calculating a Hamming distance, the present invention is not limited to these embodiments. For example, the calculation server may be provided on a crowd. Accordingly, the authentication systems 1, 2, and 3 can be constituted more flexibly.

Furthermore, it is unnecessary to arrange each of constitutional features physically as illustrated in the drawings. That is, the specific configuration of distribution and integration of the respective constitutional features is not limited to the examples illustrated in the drawings, and all or a part of the constitutional features can be functionally or physically constituted in a distributed or integrated manner in arbitrary units depending on various kinds of loads, use conditions, or the like. For example, the calculation module 16 and each of the encryption modules 17, 27, and 37 in the respective above-mentioned embodiments may be integrated.

In addition, all or any part of various kinds of processing functions performed in each unit may be performed on a CPU (or a microcomputer such as an MPU or a micro controller unit (MCU)). It is needless to say that all or any part of the various kinds of processing functions may also be performed on a program analyzed and executed by a CPU (or a microcomputer such as an MPU, an MCU, or the like), or wired-logic-controlled hardware.

Figure 13:
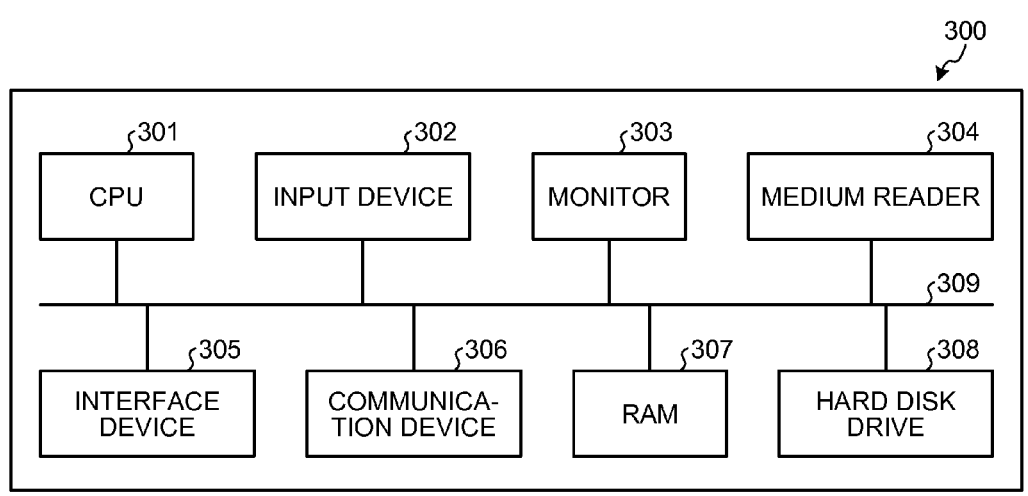
FIG. 13 is an explanatory view illustrating one example of a computer that executes an information processing program.

Here, various kinds of processing explained in the above-mentioned embodiments can be achieved when programs prepared in advance are executed by a computer. Hereinafter, the explanation is made with respect to one example of a computer that executes programs each of which has an identical function with the case of each embodiment mentioned above. FIG. 13 is an explanatory view illustrating one example of a computer that executes an information processing program.

As illustrated in FIG. 13, a computer 300 has a CPU 301 that performs various kinds of arithmetic processing, an input device 302 that accepts data input, and a monitor 303. The computer 300 also has a medium reader 304 that reads a program or the like from a storage medium, an interface device 305 for connecting with various units, and a communication device 306 for connecting with other units in a wired or wireless manner. The computer 300 also has a RAM 307 that stores therein the various kinds of information temporarily, and a hard disk drive 308. Furthermore, each of the devices 301 to 308 is connected to a bus 309.

The hard disk drive 308 stores therein information processing programs each having a function same as that of each of the processing modules of the generation module 15, the calculation module 16, and the encryption module 17, 27, or 37 that are illustrated in FIGS. 2, 6, and 10. Furthermore, the hard disk drive 308 stores therein various data for achieving the information processing programs. The input device 302 accepts, for example, the input of a password from a user, or the input of management information from an administrator of the computer 300. The monitor 303 displays thereon, for example, a password input screen for authentication, or various kinds of information when the administrator of the computer 300 performs maintenance or the like. The interface device 305 is, for example, connected with a printer or the like. The communication device 306 is connected to the network N and, for example, exchanges various kinds of information with a calculation server that calculates a Hamming distance and an authentication server that performs verification of the Hamming distance.

The CPU 301 reads out and executes the respective programs stored in the hard disk drive 308 to load the programs to the RAM 307 thus performing various kinds of processing. These programs can operate the computer 300 as the generation module 15, the calculation module 16, and encryption module 17, 27, or 37 that are illustrated in FIGS. 2, 6, and 10.

The above-mentioned information processing programs does not always need to be stored in the hard disk drive 308. For example, the computer 300 may read out and execute the programs stored in a storage medium from which the computer 300 can read out the programs. The storage medium from which the computer 300 can read out the programs corresponds, for example, to a portable recording media such as a CD-ROM, a DVD disk, or a universal serial bus (USB) memory, a semiconductor memory such as a flash memory, or a hard disk drive. Furthermore, to consider the case where these information processing programs are stored in a device connected to a public line, the Internet, a local area network (LAN), or the like, the computer 300 may be configured to read out the information processing programs from the device to execute the programs.

The embodiments of the present invention are capable of keeping organism information secret from an authentication server.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
    generating feature information based on organism information of a user;
    calculating a first cryptogram based on a logical operation of the feature information generated and a random number;
    encrypting the first cryptogram into a second cryptogram by using a cryptographic algorithm capable of calculating a Hamming distance in an encrypted state; and
    transmitting the encrypted second cryptogram to a network to which a server having a key that decrypts the encrypted Hamming distance is connected.

2. The non-transitory computer-readable recording medium according to claim 1, wherein the calculating calculates the first cryptogram based on an exclusive logical sum as the logical operation.

3. The non-transitory computer-readable recording medium according to claim 1, wherein the encrypting encrypts the first cryptogram into the second cryptogram by using homomorphic encryption as the cryptographic algorithm.

4. The non-transitory computer-readable recording medium according to claim 1, wherein the calculating calculates the first cryptogram by using a random number unique to the user as the random number.

5. The non-transitory computer-readable recording medium according to claim 1, the information processing program causing the computer to execute the process further comprising:
    controlling whether to perform the encrypting in a case out of both of when registration of the feature information is performed and when verification of the feature information is performed, when the registration of the feature information is performed, and when the verification of the feature information is performed.

6. An information processing apparatus, comprising:
    a processor that executes a process including
        generating feature information based on organism information of a user;
        calculating a first cryptogram based on a logical operation of the feature information generated and a random number;
        encrypting the first cryptogram into a second cryptogram by using a cryptographic algorithm capable of calculating a Hamming distance in an encrypted state; and
        transmitting the encrypted second cryptogram to a network to which a server having a key that decrypts the encrypted Hamming distance is connected.

7. The information processing apparatus, according to claim 6, wherein the calculating calculates the first cryptogram based on an exclusive logical sum as the logical operation.

8. An information processing method comprising:
    generating, when registration of feature information based on organism information of a user is performed, the feature information, using a processor;
    calculating a first cryptogram based on a logical operation of the feature information generated and a random number, using the processor;
    encrypting the first cryptogram into a second cryptogram by using a cryptographic algorithm capable of calculating a Hamming distance in an encrypted state, using the processor;
    generating, when verification of the feature information is performed, the feature information, using the processor;
    calculating a first cryptogram based on a logical operation of the feature information generated and the random number, using the processor;

encrypting the first cryptogram into a second cryptogram by using a cryptographic algorithm capable of calculating a Hamming distance in an encrypted state, using the processor; and transmitting the encrypted second cryptogram to a network to which a server having a key that decrypts the encrypted Hamming distance is connected.

9. The information processing method according to claim 8, wherein the calculating of the first cryptogram calculates the first cryptogram based on an exclusive logical sum as the logical operation.

10. An information processing method comprising:
generating, when registration of feature information based on organism information of a user is performed, the feature information, using a processor;
calculating a first cryptogram based on a logical operation of the feature information generated and a random number, using the processor;
encrypting the first cryptogram into a second cryptogram by using a cryptographic algorithm capable of calculating a Hamming distance in an encrypted state, using the processor;
transmitting the encrypted second cryptogram to a network to which a server having a key that decrypts the encrypted Hamming distance is connected, using the processor;
generating, when verification of the feature information is performed, the feature information, using the processor;
calculating a first cryptogram based on a logical operation of the feature information generated and the random number, using the processor; and
transmitting the calculated first cryptogram to the network, using the processor.

11. The information processing method according to claim 10, wherein the calculating of the first cryptogram calculates the first cryptogram based on an exclusive logical sum as the logical operation.

12. An information processing method comprising:
generating, when registration of feature information based on organism information of a user is performed, the feature information, using a processor;
calculating a first cryptogram based on a logical operation of the feature information generated and a random number, using the processor;
transmitting the calculated first cryptogram to a network, using the processor;
generating, when verification of the feature information is performed, the feature information, using the processor;
calculating a first cryptogram based on a logical operation of the feature information generated and the random number, using the processor;
encrypting the first cryptogram into a second cryptogram by using a cryptographic algorithm capable of calculating a Hamming distance in an encrypted state by a calculation server, using the processor; and
transmitting the encrypted second cryptogram to the network, using the processor,
wherein a server having a key that decrypts the encrypted Hamming distance is connected to the network.

13. The information processing method according to claim 12, wherein the calculating of the first cryptogram calculates the first cryptogram based on an exclusive logical sum as the logical operation.

14. An information processing system comprising:
an information processing apparatus;
a calculation server; and
an authentication server,
the information processing apparatus having
a first processor that executes a process including
generating feature information based on organism information of a user;
calculating a first cryptogram based on a logical operation of the feature information generated and a random number;
encrypting the first cryptogram into a second cryptogram by using a cryptographic algorithm capable of calculating a Hamming distance in an encrypted state;
transmitting one or more cryptograms out of the first cryptogram and the second cryptogram to the calculation server; and
receiving a verification result from the authentication server,
the calculation server having
a memory; and
a second processor coupled to the memory, wherein the second processor executes a process including
receiving one or more cryptograms out of the first cryptogram and the second cryptogram from the information processing apparatus;
storing the first cryptogram as registration information in the memory;
calculating a Hamming distance between the first cryptogram stored in the memory and one or more cryptograms out of the first cryptogram and the second cryptogram that are received; and
transmitting the calculated Hamming distance to the authentication server, and
the authentication server having
a third processor that executes a process including
receiving the Hamming distance from the calculation server;
determining the Hamming distance to be authenticated as a verification result when the Hamming distance is less than a predetermined value and determines the Hamming distance not to be authenticated as a verification result when the Hamming distance is equal to or more than the predetermined value; and
transmitting the verification result to the information processing apparatus.

15. The information processing system according to claim 14, wherein the calculating of the information processing apparatus calculating the first cryptogram based on an exclusive logical sum as the logical operation.

* * * * *